US012731602B2

(12) United States Patent
Lee

(10) Patent No.: US 12,731,602 B2
(45) Date of Patent: Sep. 8, 2026

(54) METHOD OF OPERATING SINGING MODE AND ELECTRONIC DEVICE FOR PERFORMING THE SAME

(71) Applicant: SAMSUNG ELECTRONICS CO., LTD., Suwon-si (KR)

(72) Inventor: Chulmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 18/391,201

(22) Filed: Dec. 20, 2023

(65) Prior Publication Data

US 2024/0127849 A1 Apr. 18, 2024

Related U.S. Application Data

(63) Continuation of application No. PCT/KR2023/013811, filed on Sep. 14, 2023.

(30) Foreign Application Priority Data

Sep. 16, 2022 (KR) ........................ 10-2022-0117103
Oct. 13, 2022 (KR) ........................ 10-2022-0131592

(51) Int. Cl.
*G10L 25/78* (2013.01)
*G10L 25/72* (2013.01)
*H04R 1/10* (2026.01)

(52) U.S. Cl.
CPC .............. *G10L 25/78* (2013.01); *G10L 25/72* (2013.01); *H04R 1/1091* (2013.01); *H04R 2420/07* (2013.01); *H04R 2430/01* (2013.01)

(58) Field of Classification Search
CPC ... G10L 25/78; G10L 25/72; G10L 2015/088; G10L 2015/223; G10L 15/22;
(Continued)

(56) References Cited

U.S. PATENT DOCUMENTS 8,468,014 B2 6/2013 Master et al.
10,373,611 B2 8/2019 Jeyachandran et al.
(Continued)

FOREIGN PATENT DOCUMENTS

KR 10-0755824 B1 9/2007
KR 10-2014-0118220 A 10/2014
(Continued)

OTHER PUBLICATIONS

Internal Search Report (PCT/ISA/210) issued Dec. 15, 2023 by the International Searching Authority in International Patent Application No. PCT/KR2023/013811.

*Primary Examiner* — Michael Colucci
(74) *Attorney, Agent, or Firm* — Sughrue Mion, PLLC

(57) ABSTRACT

A wireless audio device includes a memory including instructions; and a processor operatively connected to the memory and configured to execute the instructions to: detect an audio signal, determine, based on an analysis result of the audio signal, an operation mode of the wireless audio device to be one of a singing mode and a dialogue mode, and control an output signal of the wireless audio device according to the determined operation mode, wherein the dialogue mode is configured to output one or more ambient sounds included in the audio signal, and wherein the singing mode is configured to output one or more media sounds and the one or more ambient sounds included in the audio signal.

17 Claims, 13 Drawing Sheets

(58) Field of Classification Search
CPC ... G10L 25/81; H04R 1/1091; H04R 2420/07; H04R 2430/01; H04R 3/00; H04R 1/1016; H04R 1/1083; G06F 3/04847; G06F 3/16
See application file for complete search history.

(56) References Cited

U.S. PATENT DOCUMENTS

| | | | | |
|---|---|---|---|---|
| 11,259,127 | B2 | 2/2022 | De Haan et al. | |
| 11,410,678 | B2 * | 8/2022 | Lesso | G10L 25/30 |
| 2007/0025550 | A1 * | 2/2007 | Saitoh | G06F 21/6218 380/1 |
| 2008/0181417 | A1 * | 7/2008 | Pereg | G10L 17/00 704/E11.001 |
| 2009/0034748 | A1 * | 2/2009 | Sibbald | G10K 11/17885 381/71.6 |
| 2013/0139673 | A1 * | 6/2013 | Ellis | G10H 1/40 84/609 |
| 2015/0223110 | A1 * | 8/2015 | Lindner | H04W 4/08 455/518 |
| 2017/0134821 | A1 * | 5/2017 | D'Amelio | H04N 21/42203 |
| 2017/0330238 | A1 * | 11/2017 | Zhou | G06Q 30/0262 |
| 2018/0167715 | A1 | 6/2018 | Graylin et al. | |
| 2018/0174561 | A1 * | 6/2018 | Nariyama | G10H 1/361 |
| 2019/0043528 | A1 * | 2/2019 | Humphrey | G06F 16/683 |
| 2020/0037084 | A1 * | 1/2020 | Cheung | A61F 11/06 |
| 2020/0260186 | A1 * | 8/2020 | Stachura | G10L 15/30 |
| 2022/0130360 | A1 * | 4/2022 | Tao | G11B 27/34 |
| 2022/0189477 | A1 * | 6/2022 | Shin | H03G 3/32 |
| 2022/0239269 | A1 | 7/2022 | Min et al. | |
| 2023/0164475 | A1 * | 5/2023 | Chen | H04R 1/1016 381/74 |

FOREIGN PATENT DOCUMENTS

| | | | |
|---|---|---|---|
| KR | 10-1647974 | B1 | 8/2016 |
| KR | 10-2016-0113781 | A | 10/2016 |
| KR | 10-2018-0039468 | A | 4/2018 |
| KR | 10-1899021 | B1 | 9/2018 |
| KR | 10-2022-0106643 | A | 7/2022 |

* cited by examiner

METHOD OF OPERATING SINGING MODE AND ELECTRONIC DEVICE FOR PERFORMING THE SAME

CROSS-REFERENCE TO RELATED APPLICATIONS

This application is a continuation application of International Application No. PCT/KR2023/013811 designating the United States, filed on Sep. 14, 2023, in the Korean Intellectual Property Receiving Office and claiming priority to Korean Patent Application No. 10-2022-0117103, filed on Sep. 16, 2022, and Korean Patent Application No. 10-2022-0131592, filed on Oct. 13, 2022, in the Korean Intellectual Property Office, the disclosures of which are incorporated by reference herein in their entireties.

BACKGROUND

1. Field

The disclosure relates to a method of operating a singing mode and an electronic device for performing the method.

2. Description of Related Art

A wireless audio device, such as earbuds, is widely used. The wireless audio device may wirelessly connect to an electronic device, such as a mobile phone, and may output audio data received from the mobile phone. Wireless connection of the wireless audio device to the electronic device may improve user convenience. However, this improved user convenience may increase the time a user wears the wireless audio device.

The wireless audio device may be worn on the user's ears, where the user may not hear an external sound while wearing the wireless audio device. The wireless audio device may output ambient sounds so that the user of the wireless audio device may hear an external sound. For example, the wireless audio device may provide ambient sounds to the user by outputting a sound received by a microphone of the wireless audio device in real time.

SUMMARY

According to an aspect of the disclosure, a wireless audio device includes: a memory including instructions; and a processor operatively connected to the memory and configured to execute the instructions to: detect an audio signal, determine, based on an analysis result of the audio signal, an operation mode of the wireless audio device to be one of a singing mode and a dialogue mode, and control an output signal of the wireless audio device according to the determined operation mode, wherein the dialogue mode is configured to output one or more ambient sounds included in the audio signal, and wherein the singing mode is configured to output one or more media sounds and the one or more ambient sounds included in the audio signal.

According to an aspect of the disclosure, a wireless audio device includes: a memory including instructions; and a processor operatively connected to the memory and configured to execute the instructions to: detect an audio signal, determine an operation mode of the wireless audio device for the audio signal to be a singing mode, and control an output signal of the wireless audio device according to the singing mode, wherein the singing mode is configured to output one or more media sounds and one or more ambient sounds included in the audio signal.

According to an aspect of the disclosure, wireless audio device includes: a memory including instructions; and a processor operatively connected to the memory and configured to execute the instructions to: detect an audio signal, determine, based on an analysis result of the audio signal, an operation mode of the wireless audio device for the audio signal to be one of a singing mode and a dialogue mode, based on a determination that the operation mode is the dialogue mode, outputting one or more ambient sounds included in the audio signal, based on a determination that the operation mode is the singing mode, output one or more media sounds and the one or more ambient sounds included in the audio signal, and in the singing mode, based on a singing voice not being detected in the one or more ambient sounds for a period of time greater than or equal to a predetermined period time, deactivate the singing mode.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
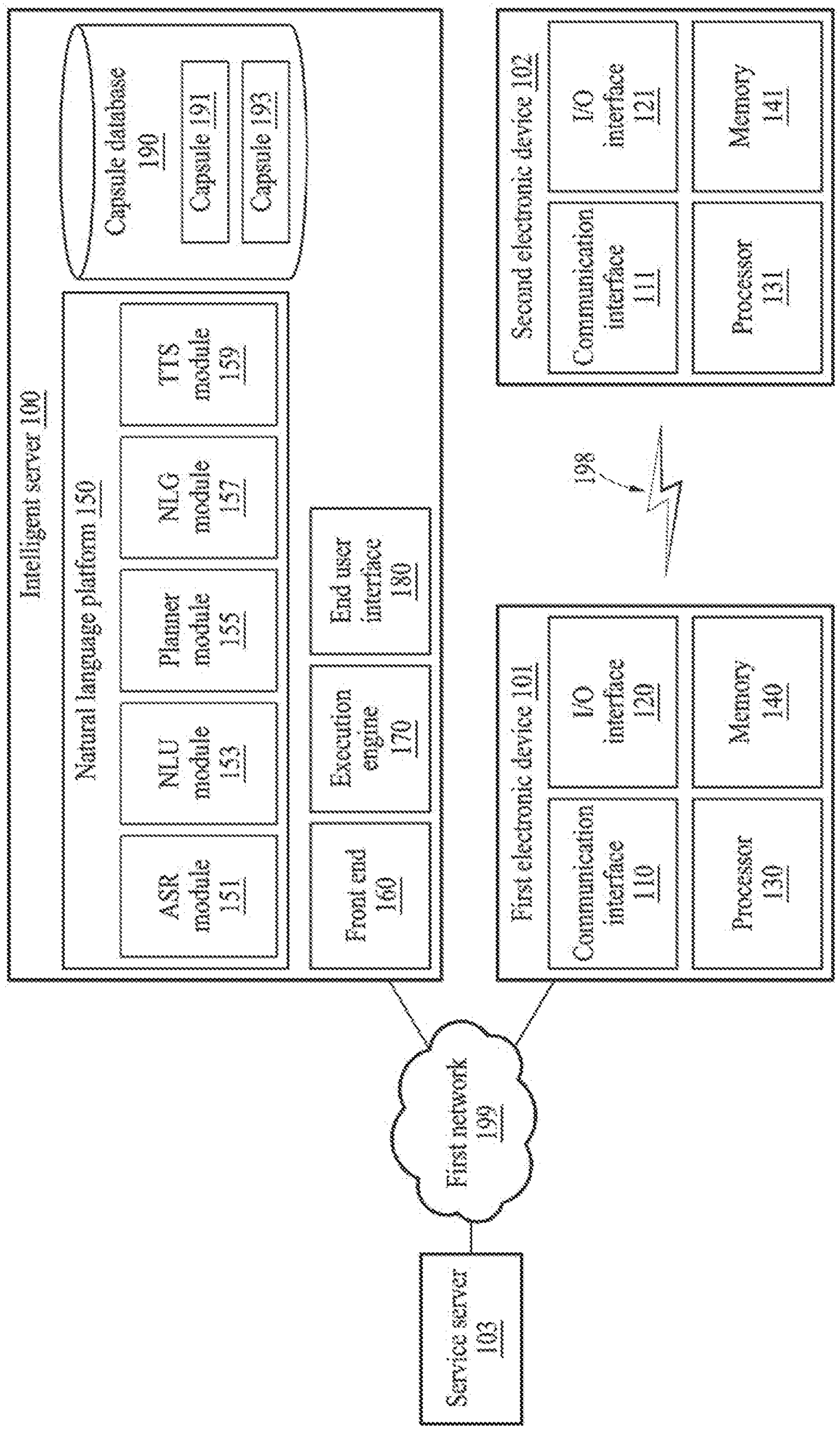
FIG. 1 is a block diagram illustrating an integrated intelligence system according to an embodiment.

Hereinafter, embodiments will be described in detail with reference to the accompanying drawings. When describing the embodiments with reference to the accompanying drawings, like reference numerals refer to like constituent elements and a repeated description related thereto will be omitted.

FIG. 1 is a block diagram illustrating an integrated intelligence system according to an embodiment.

Referring to FIG. 1, an integrated intelligent system according to an embodiment may include a first electronic device 101 (e.g., a user terminal), a second electronic device 102 (e.g., any device including earbuds or a microphone), an intelligent server 100, and a service server 103.

According to an embodiment, the first electronic device 101 may include a communication interface 110, an input/output (I/O) interface 120, at least one processor 130, and/or a memory 140. The components listed above may be operationally or electrically connected to each other.

In an embodiment, the communication interface 110 may connect to an external device (e.g., the intelligent server 100 or the service server 103) to transmit and receive data via a first network 199 (e.g., any network including a cellular network and/or a wireless local area network (WLAN)). The communication interface 110 may support data to be transmitted to and received from an external device (e.g., the second electronic device 102) through a second network 198 (e.g., a short-distance wireless communication network).

In an embodiment, the I/O interface 120 may use an I/O device (e.g., a microphone, a speaker, and/or a display) to receive a user's input (hereinafter, referred to as 'user input'), process the received user input, and/or output a result processed by the processor 130.

In an embodiment, the processor 130 may be electrically connected to the communication interface 110, the I/O interface 120, and/or the memory 140 to thus perform a designated operation. The processor 130 may execute a program (or one or more instructions) stored in the memory 140 to perform a designated operation. For example, the processor 130 may receive a user's voice input (e.g., a user's utterance) through the I/O interface 120. For example, the processor 130 may receive the user's voice input received by the second electronic device 102 through the communication interface 110. The processor 130 may transmit the received user's voice input to the intelligent server 100 through the communication interface 110.

In an embodiment, the processor 130 may receive a result corresponding to a voice input from the intelligent server 100. For example, the processor 130 may receive, from the intelligent server 100, a plan corresponding to the voice input and/or a result calculated by using the plan. The plan may be in the form of one or more executable instructions. The processor 130 may receive, from the intelligent server 100, a request for obtaining necessary information (e.g., parameters) to generate the plan corresponding to the voice input. In response to the request, the processor 130 may transmit the necessary information to the intelligent server 100.

In an embodiment, the processor 130 may visually, tactilely, and/or audibly output a result of executing a designated operation according to the plan through the I/O interface 120. The processor 130 may, for example, sequentially display results of executing a plurality of actions on the display of the first electronic device 101. In one or more examples, the processor 130 may display only a partial result of executing the plurality of actions (e.g., a result of the last action) on the display of the first electronic device 101. The processor 130 may provide feedback to the second electronic device 102 by transmitting an execution result or a partial execution result to the second electronic device 102 through the second network 198.

In an embodiment, the processor 130 may recognize a voice input to perform one or more operations. For example, the processor 130 may execute an intelligent app (or a voice recognition app) for processing a voice input in response to a designated voice input (e.g., wake up!). The processor 130 may provide a voice recognition service through an intelligent app (or an application program). The processor 130 may transmit a voice input to the intelligent server 100 through an intelligent app and receive a result corresponding to the voice input from the intelligent server 100.

According to an embodiment, the second electronic device 102 may include a communication interface 111, an I/O interface 121, at least one processor 131, and/or a memory 141. The components listed above may be operationally or electrically connected to each other. In an embodiment, the second electronic device 102 may be a set of a plurality of electronic devices configured as one set (e.g., the left earbud and the right earbud).

In an embodiment, the communication interface 111 may support connection of the second electronic device 102 to an external device (e.g., the first electronic device 101) through the second network 198. The I/O interface 121 may use an I/O device (e.g., at least one microphone, at least one speaker, and/or a button) to receive a user input, process the received user input, and/or output a result processed by the processor 131.

In an embodiment, the processor 131 may be electrically connected to the communication interface 111, the I/O interface 121, and/or the memory 141 to perform a designated operation. The processor 131 may perform a designated operation by executing a program (or one or more instructions) stored in the memory 141. For example, the processor 131 may receive the user's voice input (e.g., the user's utterance) through the I/O interface 121. In an embodiment, the processor 131 may perform voice activity detection (VAD) using at least one sensor of the second electronic device 102. The processor 131 may detect the user's utterance of the second electronic device 102 using an acceleration sensor and/or a microphone.

In an embodiment, the processor 131 may transmit a received voice input to the first electronic device 101 through the second network 198 by using the communication interface 111.

In an embodiment, the processor 131 may receive a result corresponding to the voice input from the first electronic device 101 through the second network 198. For example, the processor 131 may receive data (e.g., text data) corresponding to the result corresponding to the voice input from the first electronic device 101. The processor 131 may output the received result through the I/O interface 121.

In an embodiment, the processor 131 may recognize a voice input to perform one or more operations. For example, the processor 131 may request the first electronic device 101 to execute an intelligent app (or a voice recognition app) for processing a voice input in response to a designated voice input (e.g., wake up!).

The intelligent server 100 may receive the user's voice input from the first electronic device 101 through the communication network 199. The intelligent server 100 may convert audio data corresponding to the received user's voice input into text data. According to an embodiment, the intelligent server 100 may generate at least one plan for performing a task corresponding to the user's voice input based on the text data. The intelligent server 100 may transmit the generated plan or a result according to the generated plan to the first electronic device 101 through the first network 199.

The intelligent server 100 according to an embodiment may include a front end 160, a natural language platform 150, a capsule database (DB) 190, an execution engine 170, and/or an end user interface 180.

In an embodiment, the front end 160 may receive, from the first electronic device 101, a voice input received by the first electronic device 101. The front end 160 may transmit a response corresponding to the voice input to the electronic device 101.

According to an embodiment, the natural language platform 150 may include an automatic speech recognition (ASR) module 151, a natural language understanding (NLU) module 153, a planner module 155, a natural language generator (NLG) module 157, and/or a text-to-speech (TTS) module 159.

The ASR module 151 may convert the voice input received from the first electronic device 101 into text data. The NLU module 153 may determine the user's intent and/or parameters based on the text data of the voice input.

The planner module 155 may generate a plan using the user's intent and parameters determined by the NLU module 153. According to an embodiment, the planner module 155 may determine a plurality of domains required to perform a task based on the determined user's intent. The planner module 155 may determine a plurality of actions included in each of the plurality of domains determined based on the user's intent. According to an embodiment, the planner module 155 may determine parameters required to execute the determined plurality of actions or a result value output by the execution of the plurality of actions. The parameters and the result value may be defined as the concept of a designated form (or class). Accordingly, the plan may include a plurality of actions and a plurality of concepts determined by the user's intent. The planner module 155 may determine a relationship between the plurality of actions and the plurality of concepts stepwise, or based on a hierarchical relationship between the actions. For example, the planner module 155 may determine an order of executing the plurality of actions determined according to the user's intent based on the plurality of concepts (e.g., parameters required for execution of the plurality of actions, and results output by the execution of the plurality of actions). Accordingly, the planner module 155 may generate a plan including connection information (e.g., ontology) between the plurality of actions and the plurality of concepts. The planner module 155 may generate a plan using information stored in the capsule DB 190 that stores a set of relationships between concepts and actions.

In an embodiment, the planner module 155 may generate a plan based on an artificial intelligent (AI) system. The AI system may be a rule-based system, a neural network-based system (e.g., a feedforward neural network (FNN) or a recurrent neural network (RNN)), a combination thereof, or another AI system. The planner module 155 may select a plan corresponding to the user's request from a set of predefined plans or may generate a plan in real time in response to the user's request.

In an embodiment, the NLG module 157 may change designated information into a text form. The information changed into the text form may be in the form of a natural language utterance. The TTS module 159 may change information in a text form into information in a speech form.

In an embodiment, the capsule DB 190 may store information about a relationship between concepts and actions corresponding to a plurality of domains (e.g., applications). According to an embodiment, the capsule DB 190 may store at least one of capsules 191 and 193 in the form of a concept action network (CAN). For example, the capsule DB 190 may store, in the form of a CAN, an operation of processing a task corresponding to the user's voice input and parameters necessary for actions A capsule may include a plurality of action objects (or action information) and/or concept objects (or concept information) included in a plan.

The execution engine 170 may calculate a result using a generated plan. The end user interface 180 may transmit the calculated result to the first electronic device 101.

According to an embodiment, some functions (e.g., the natural language platform 150) or all functions of the intelligent server 100 may be implemented by the first electronic device 101. For example, the first electronic device 101 may include a natural language platform separately from the intelligent server 100 or directly implement at least some of operations of the natural language platform 150 (e.g., the ASR module 151, the NLU module 153, the planner module 155, the NLG module 157, and/or the TTS module 159) of the intelligent server 100.

The service server 103 according to an embodiment may provide a designated service (e.g., a food order or hotel reservation) to the first electronic device 101. The service server 103 may be a server operated by a third party. The service server 103 may communicate with the intelligent server 100 and/or the first electronic device 101 through the first network 199. The service server 103 may communicate with the intelligent server 100 through a separate connection. The service server 103 may transmit, to the intelligent server 100, information (e.g., operation information and/or concept information for providing a designated service) for generating a plan corresponding to a voice input received by the first electronic device 101. The transmitted information may be stored in the capsule DB 190. The service server 103 may transmit, to the intelligent server 100, result information received from the first electronic device 101 according to the plan.

Figure 2:
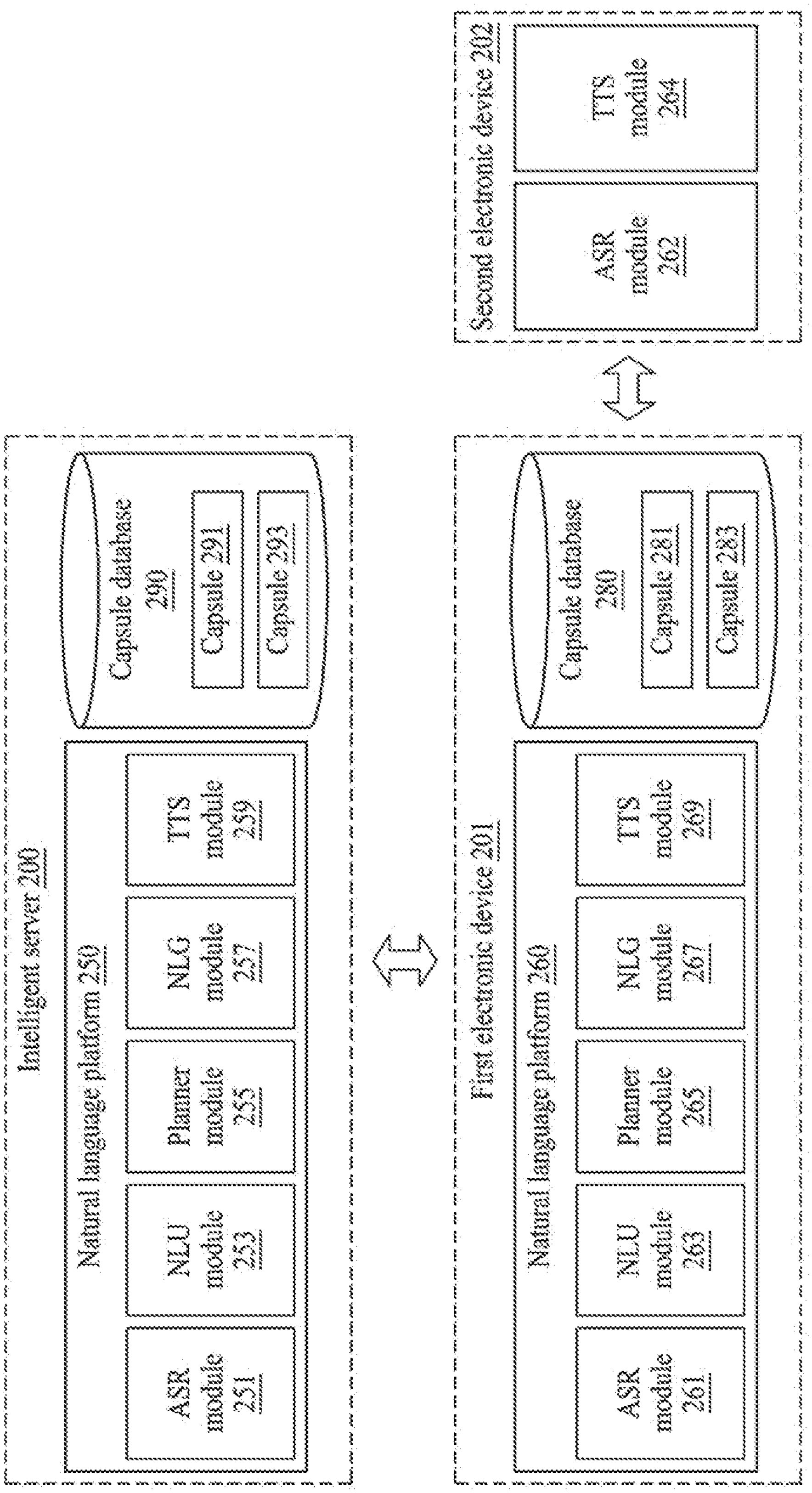
FIG. 2 is a block diagram illustrating an integrated intelligent system according to an embodiment.

FIG. 2 is a block diagram illustrating an integrated intelligent system according to an embodiment.

Referring to FIG. 2, an integrated intelligent system may include a first electronic device 201 (e.g., the first electronic device 101 of FIG. 1), a second electronic device 202 (e.g., the second electronic device 102 of FIG. 1), and an intelligent server 200 (e.g., the intelligent server 100 of FIG. 1). The first electronic device 201 may be connected to the intelligent server 200 through a network so as to transmit and receive data to and from each other. The first electronic device 201 may be connected to the second electronic device 202 through a local area network (LAN) so as to transmit and receive data. According to an embodiment, the integrated intelligent system may include a single device or a plurality of devices. For example, each of the devices may include a component having substantially the same or similar functions. A component of a device may be replaced with a component of another device.

According to an embodiment, the intelligent server 200 may include all or at least some of components of the intelligent server 100 shown in FIG. 1. For example, the intelligent server 200 may include the natural language platform 150 and/or the capsule DB 190 of the intelligent server 100 of FIG. 1. However, the components of the intelligent server 200 are not limited to those shown in FIG. 2. At least some components (e.g., an ASR module 251, an NLU module 253, a planner module 255, an NLG module 257, and/or a TTS module 259) of a natural language platform 250 may be omitted and some components (e.g., the front end 160, the execution engine 170, and/or the end user interface 180) of the intelligent server 100 of FIG. 1 may be further included in the components of the intelligent server 200.

According to an embodiment, the first electronic device 201 may include a natural language platform 260 and/or a capsule DB 280. The natural language platform 260 may include an ASR module 261, an NLU module 263, a planner module 265, and an NLG module 267, and/or a TTS module 269. The ASR module 261, the NLU module 263, the planner module 265, the NLG module 267, and the TTS module 269 may perform functions that are substantially the same as or similar to those of the ASR module 151, the NLU module 153, the planner module 155, the NLG module 157, and the TTS module 159, respectively.

According to an embodiment, the capsule DB 280 may perform functions that are substantially the same as or similar to those of capsule DBs 190 and 290 of the intelligent servers 100 and 200. The capsule DB 280 may store information about relationships between a plurality of actions and a plurality of concepts included in a plan generated by the planner module 265. For example, the capsule DB 280 may store at least one of capsules 281 and 283.

According to an embodiment, the first electronic device 201 (e.g., the NLP 260 and/or the capsule DB 280) and the intelligent server 200 (e.g., the NLP 250 and/or the capsule DB 290) may perform at least one function (or operation) in conjunction with each other or may perform at least one function (or operation) independently. For example, the first electronic device 201 may not transmit a received user's voice input to the intelligent server 200 and may autonomously perform voice recognition. In one or more examples, the first electronic device 201 may convert, into text data, a voice input received through the ASR module 261. The first electronic device 201 may transmit the text data to the intelligent server 200. The intelligent server 200 may determine the user's intent and/or parameters from the text data through the NLU module 253. The intelligent server 200 may generate a plan through the planner module 255 based on the determined user's intent and parameters and transmit the generated plan to the first electronic device 201 or transmit the determined user's intent and parameters to the first electronic device 201 so that a plan may be generated through the planner module 265 of the first electronic device 201. The planner module 265 of the first electronic device 201 may generate at least one plan for performing a task corresponding to a voice input using information stored in the capsule DB 280.

For example, the first electronic device 201 may convert a voice input received through the ASR module 261 into text data and use the NLU module 263 to determine the user's intent and/or parameters based on the text data. The first electronic device 201 may generate a plan through the planner module 265 based on the determined user's intent and parameters or transmit the determined user's intent and parameters to the intelligent server 200 such that a plan may be generated through the planner module 255 of the intelligent server 200. For example, when the first electronic device 201 does not include the planner module 265 and/or the capsule DB 280, the first electronic device 201 may generate a plan through the intelligent server 200.

For example, the first electronic device 201 may detect an utterance pattern that is difficult for the ASR module 261 or the NLU module 263 to learn and may transmit, to the intelligent server 200, a voice input corresponding to the detected utterance pattern such that the voice input may be processed by the ASR module 251 and the NLU module 253 of the intelligent server 200.

As understood by one of ordinary skill in the art, the embodiments of the present disclosure are not limited to the above examples. For example, the first electronic device 201 may process a received voice input within the terminal of the first electronic device 201 and calculate a result corresponding to the received voice input. For example, the first electronic device 201 and the intelligent server 200 may divide a voice input in module units for processing and may process the voice input in collaboration between applicable modules of the first electronic device 201 and the intelligent server 200. For example, the NLU module 263 of the first electronic device 201 and the NLU module 253 of the intelligent server 200 may operate together to calculate one result value (e.g., the user's intent and/or parameters).

According to an embodiment, the second electronic device 202 may include an ASR module 262 and/or a TTS 264. The ASR module 262 and the TTS module 264 may perform functions that are substantially the same as or similar to those of the ASR module 151 and the TTS module 159 of FIG. 1, respectively.

According to an embodiment, the first electronic device 201 and the second electronic device 202 may perform at least one function (or operation) in conjunction with each other or may independently perform at least one function (or operation). For example, the second electronic device 202 may perform voice recognition on a voice input using the ASR module 262. The second electronic device 202 may perform a function corresponding to the voice input based on voice recognition. For example, the second electronic device 202 may transmit a command corresponding to a recognized voice command to the first electronic device 201. The second electronic device 202 may output data received from the first electronic device 201. For example, the second electronic device 202 may convert data received from the first electronic device 201 into a voice by using the TTS module 264 and output the voice.

Figure 3:
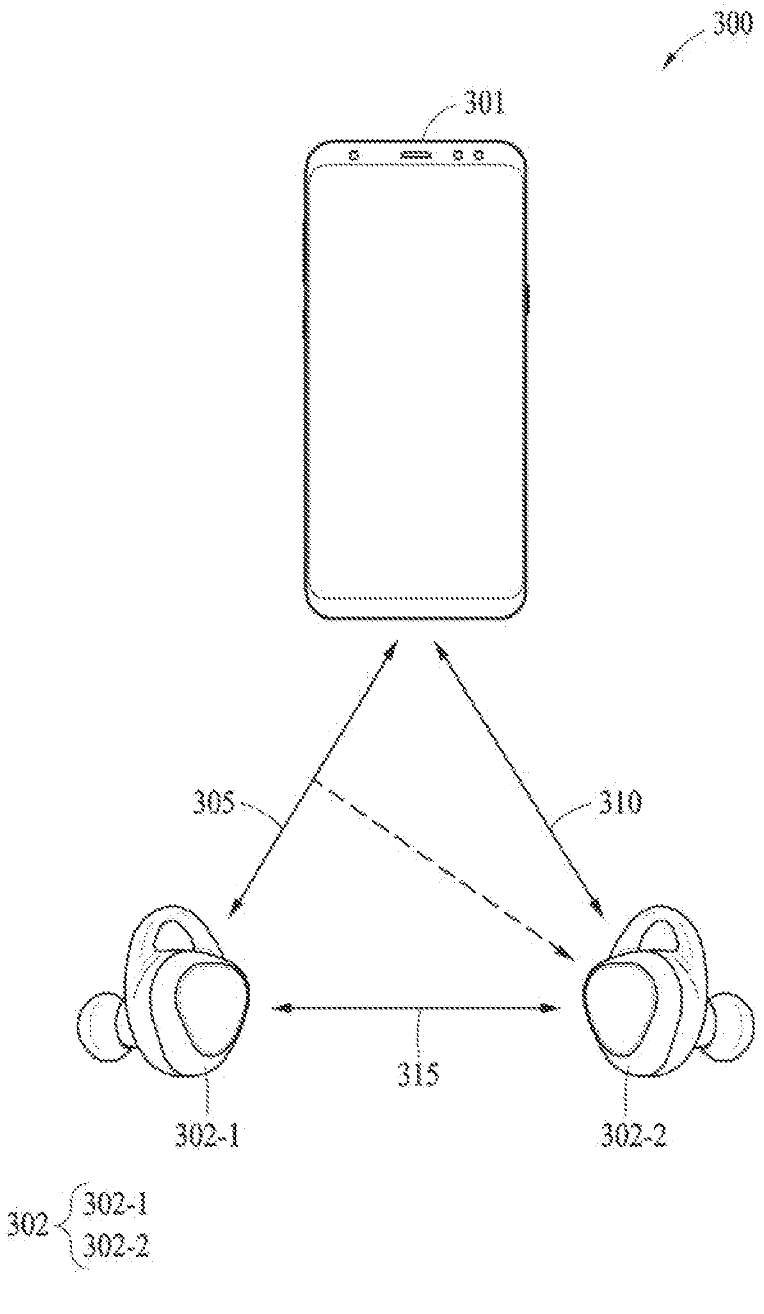
FIG. 3 illustrates a communication environment between a wireless audio device and an electronic device, according to an embodiment.

FIG. 3 illustrates a communication environment between a wireless audio device and an electronic device according to an embodiment.

Referring to FIG. 3, according to an embodiment, an electronic device 301 may have one or more components that are the same as or similar to those of the first electronic device 101 shown in FIG. 1 and the first electronic device 201 shown in FIG. 2 and may perform one or more functions that are the same as the similar to those of the first electronic device 101 shown in FIG. 1 and the first electronic device 201 shown in FIG. 2. In addition, a wireless audio device 302 (e.g., a first wireless audio device 302-1 and/or a second wireless audio device 302-2) may include one or more components that are the same as or similar to those of the second electronic device 102 shown in FIG. 1 and the second electronic device 202 shown in FIG. 2 and may perform one or more functions that are the same as or similar to those of the second electronic device 102 shown in FIG. 1 and the second electronic device 202 shown in FIG. 2. Hereinafter, unless otherwise stated, the wireless audio device 302 may refer to the first wireless audio device 302-1, the second wireless audio device 302-2, or the first and second wireless audio devices 302-1 and 302-2. The electronic device 301 may include, for example, a user terminal, such as a smartphone, a tablet, a desktop computer, a laptop computer, or any other suitable electronic device known to one of ordinary skill in the art. The wireless audio device 302 may include, but is not limited to, wireless earphones, headsets, earbuds, or speakers. The wireless audio device 302 may include various types of devices (e.g., hearing aids or portable audio devices) that receive audio signals and output the received audio signals. The term "wireless audio device" may be used to be distinguished from the electronic device 301 and refer to an electronic device, wireless earphones, earbuds, a true wireless stereo (TWS), or an earset.

For example, the electronic device 301 and the wireless audio device 302 may perform wireless communication in a short range by a Bluetooth network defined by a Bluetooth™ special interest group (SIG). The Bluetooth network may include, for example, a Bluetooth legacy network or a Bluetooth low energy (BLE) network. According to an embodiment, the electronic device 301 and the wireless audio device 302 may perform wireless communication through one of a Bluetooth legacy network and a BLE network or may perform wireless communication through both of the two networks.

According to an embodiment, the electronic device 301 may serve as a primary device (e.g., a master device) and the wireless audio device 302 may serve as a secondary device (e.g., a slave device). The number of devices serving as secondary devices is not limited to the example shown in FIG. 3. According to an embodiment, the role of the primary device or the role of the secondary device may be determined by an operation of generating a link (e.g., a first link 305, a second link 310, and/or a link 315) therebetween. According to another embodiment, one (e.g., the first wireless audio device 302-1) of the first wireless audio device 302-1 and the second wireless audio device 302-2 may perform the role of a primary device and the other device may perform the role of a secondary device.

According to an embodiment, the electronic device 301 may transmit, to the wireless audio device 302, a data packet including content, such as text, audio, an image, or a video. In one or more examples, at least one of the wireless audio devices 302 may transmit a data packet to the electronic device 301. For example, when music is played on the electronic device 301, the electronic device 301 may transmit, to the wireless audio device 302, a data packet including content (e.g., music data) through a link (e.g., the first link 305 and/or the second link 310) generated with the wireless audio device 302. For example, the wireless audio devices 302 may transmit a data packet including content (e.g., audio data) to the electronic device 301 through a generated link. When the electronic device 301 transmits a data packet, the electronic device 301 may be referred to as a source device and the wireless audio device 302 may be referred to as a sink device.

According to an embodiment, the electronic device 301 may create or establish a link with at least one (e.g., the first wireless audio device 302-1 and/or the second wireless audio device 302-2) of the wireless audio devices 302 to transmit a data packet. For example, the electronic device 301 may create the first link 305 with the first wireless audio device 302-1 and/or the second link 310 with the second wireless audio device 302-2 based on a Bluetooth protocol or a BLE protocol. In an embodiment, the electronic device 301 may communicate with the first wireless audio device 302-1 through the first link 305 established with the first wireless audio device 302-1. In this case, for example, the second wireless audio device 302-2 may be configured to monitor the first link 305. For example, the second wireless audio device 302-2 may monitor the first link 305 and thus, receive data transmitted by the electronic device 301 through the first link 305.

According to an embodiment, the second wireless audio device 302-2 may monitor the first link 305 using information related to the first link 305. The information related to the first link 305 may include address information (e.g., the Bluetooth address of the primary device of the first link 305, the Bluetooth address of the electronic device 301, and/or the Bluetooth address of the first wireless audio device 302-1), piconet (e.g., topology) clock information (e.g., clock native (CLKN) of the primary device of the first link 305), logical transport (LT) address information (e.g., information allocated by the primary device of the first link 305), used channel map information, link key information, service discovery protocol (SDP) information (e.g., a service related to the first link 305 and/or profile information) and/or supported feature information.

Figure 4:
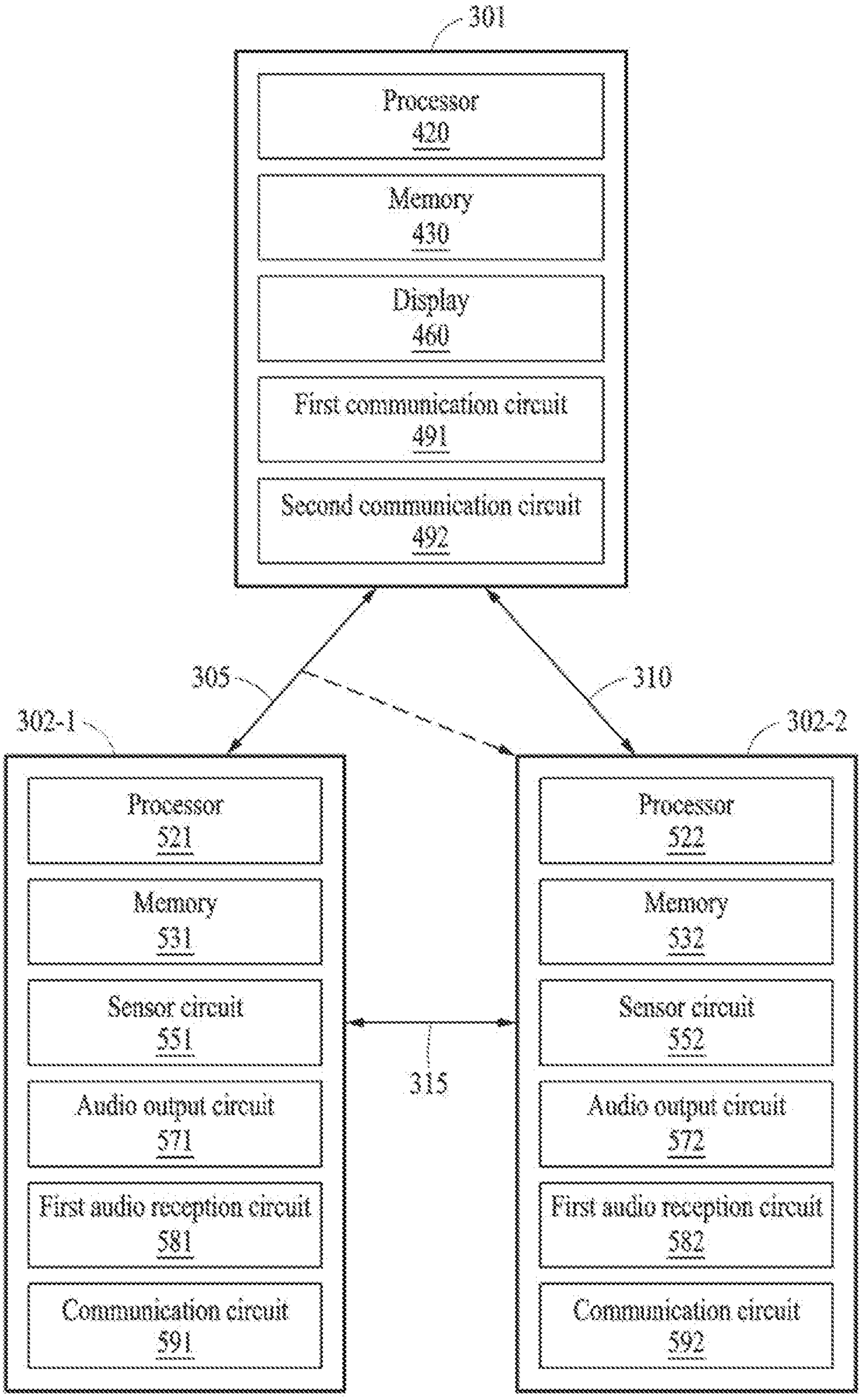
FIG. 4 is a block diagram illustrating an electronic device and wireless audio devices, according to an embodiment.

FIG. 4 is a block diagram illustrating an electronic device and wireless audio devices, according to an embodiment.

Referring to FIG. 4, according to an embodiment, an electronic device 301 may include a processor 420 (e.g., the processor 130 of FIG. 1), a memory 430 (e.g., the memory 140 of FIG. 1), a first communication circuit 491, a display 460, and/or a second communication circuit 492. The processor 420 may be operatively coupled to the memory 430, the display 460, the first communication circuit 491, and the second communication circuit 492. The memory 430 may store one or more instructions that, when the one or more instructions are executed, cause the processor 420 to perform one or more operations of the electronic device 301. The second communication circuit 492 may be configured to support wireless communication based on a Bluetooth protocol (e.g., Bluetooth legacy and/or BLE). In addition, the first communication circuit 491 may be configured to support communication based on a wireless communication standard (e.g., cellular and/or Wi-Fi) other than the Bluetooth protocol. The electronic device 301 may further include one or more additional components. For example, the electronic device 301 may further include an audio I/O device and/or a housing.

According to an embodiment, the electronic device 301 may be connected to a first wireless audio device 302-1 through the first link 305. For example, the electronic device 301 may communicate with the first wireless audio device 302-1 in the unit of timeslots set based on a clock of a primary device of the first link 305. The electronic device 301 may be connected to the second wireless audio device 302-2 through the second link 310. For example, the electronic device 301 may establish the second link 310 after connecting to the first wireless audio device 302-1. In an embodiment, the second link 310 may be omitted.

According to an embodiment, the first wireless audio device 302-1 may include a processor 521 (e.g., the processor 131 of FIG. 1), a memory 531 (e.g., the memory 141 of FIG. 1), a sensor circuit 551, an audio output circuit 571, an audio reception circuit 581, and/or a communication circuit 591.

According to an embodiment, the processor 521 may be operatively connected to the sensor circuit 551, the communication circuit 591, the audio output circuit 571, the audio reception circuit 581, and the memory 531.

According to an embodiment, the sensor circuit 551 may include at least one sensor. The sensor circuit 551 may sense information about the wearing state of the first wireless audio device 302-1, biometric information of a wearer, and/or movement. The sensor circuit 551 may include, for example, a proximity sensor for sensing a wearing state, a biosensor (e.g., a heart rate sensor) for sensing bioinformation, and/or a motion sensor (e.g., an acceleration sensor) for detecting motion. In an embodiment, the sensor circuit 551 may further include at least one of a bone conduction sensor and an acceleration sensor. In another embodiment, the acceleration sensor may be near the skin to detect bone conduction. For example, the acceleration sensor may be configured to detect vibration information in a kilohertz (kHz) unit using kHz-unit sampling relatively greater than general motion sampling. The processor 521 may identify a voice and may sense a voice, a tap, and/or wearing in a noisy environment, using vibration around a significant axis (at least one of an x axis, a y axis, and a z axis) in the vibration information of the acceleration sensor.

According to an embodiment, the audio output circuit 571 may be configured to output a sound. The audio reception circuit 581 may include a single microphone or a plurality of microphones. The audio reception circuit 581 may be configured to detect an audio signal using the single microphone or the plurality of microphones. The microphones may correspond to different audio reception paths, respectively. For example, when the audio reception circuit 581 includes a first microphone and a second microphone, an audio signal obtained by the first microphone and an audio signal by the second microphone may refer to different audio channels. The processor 521 may obtain audio data using at least one of microphones connecting to the audio reception circuit 581. For example, the processor 521 may dynamically select or determine at least one microphone for obtaining audio data from among microphones. The processor 521 may obtain audio data through beamforming performed by using the microphones. The memory 531 may store one or more instructions that, when the one or more instructions are executed, cause the processor 521 to perform one or more operations of the first wireless audio device 302-1.

According to an embodiment, the processor 521 may obtain audio data using at least one of the audio reception circuit 581 and the sensor circuit 551. For example, the processor 521 may obtain audio data using one or more microphones connecting to the audio reception circuit 581. The processor 521 may obtain the audio data by detecting vibration corresponding to an audio signal using the sensor circuit 551. For example, the processor 521 may obtain the audio data using at least one of a motion sensor, a bone conduction sensor, and an acceleration sensor. The processor 521 may be configured to process (e.g., perform noise suppression, noise cancellation, or echo cancellation) audio data obtained through various paths (e.g., at least one of the audio reception circuit 581 and the sensor circuit 551).

According to an embodiment, the first wireless audio device 302-1 may further include one or more additional components. For example, the first wireless audio device 302-1 may further include an indicator, an input interface, and/or a housing.

The second wireless audio device 302-2 may include a processor 522 (e.g., the processor 131 of FIG. 1), a memory 532 (the memory 141 of FIG. 1), a sensor circuit 552, an audio output circuit 572, an audio reception circuit 582, and/or a communication circuit 592.

According to an embodiment, the processor 522 may be operatively connected to the communication circuit 592, the audio output circuit 572, the audio reception circuit 582, and the memory 532.

According to an embodiment, the sensor circuit 552 may sense information on the wearing state of the second wireless audio device 302-2, biometric information of a wearer, and/or movement. The sensor circuit 552 may include, for example, a proximity sensor for sensing a wearing state, a biosensor (e.g., a heart rate sensor) for sensing bioinformation, and/or a motion sensor (e.g., an acceleration sensor) for detecting motion. In an embodiment, the sensor circuit 552 may further include at least one of a bone conduction sensor and an acceleration sensor. The acceleration sensor may be near the skin to detect bone conduction. For example, the acceleration sensor may be configured to detect vibration information in a kHz unit using kHz-unit sampling relatively greater than general motion sampling. The processor 522 may identify a voice and sense a voice, a tap, and/or wearing in a noisy environment, using vibration around a significant axis (at least one of an x axis, a y axis, and a z axis) in the vibration information of the acceleration sensor.

According to an embodiment, the audio output circuit 572 may be configured to output a sound. The audio reception circuit 582 may include a single microphone or a plurality of microphones. The audio reception circuit 582 may be configured to detect an audio signal using one or a plurality of microphones. The microphones may respectively correspond to different audio reception paths. For example, when the audio reception circuit 582 includes a first microphone and a second microphone, an audio signal obtained by the first microphone and an audio signal by the second microphone may refer to different audio channels. The processor 522 may obtain audio data through beamforming performed using the microphones.

The memory 532 may store one or more instructions that, when the one or more instructions are executed, cause the processor 522 to perform various operations of the second wireless audio device 302-2.

According to an embodiment, the processor 522 may obtain audio data using at least one of the audio reception circuit 582 and the sensor circuit 552. For example, the processor 522 may obtain audio data using one or more microphones connecting to the audio reception circuit 582. The processor 522 may obtain audio data by detecting vibration corresponding to an audio signal using the sensor circuit 552. For example, the processor 522 may obtain the audio data using at least one of a motion sensor, a bone conduction sensor, and an acceleration sensor. The processor 522 may be configured to process audio data (e.g., perform noise suppression, noise cancellation, or echo cancellation) obtained through various paths or equipment (e.g., at least one of the audio reception circuit 582 and the sensor circuit 552).

In an embodiment, the second wireless audio device 302-2 may further include one or more additional components. For example, the second wireless audio device 302-2 may further include an indicator (e.g., the I/O interface 121 of FIG. 1), an audio input device, an input interface, and/or a housing.

Figure 5:
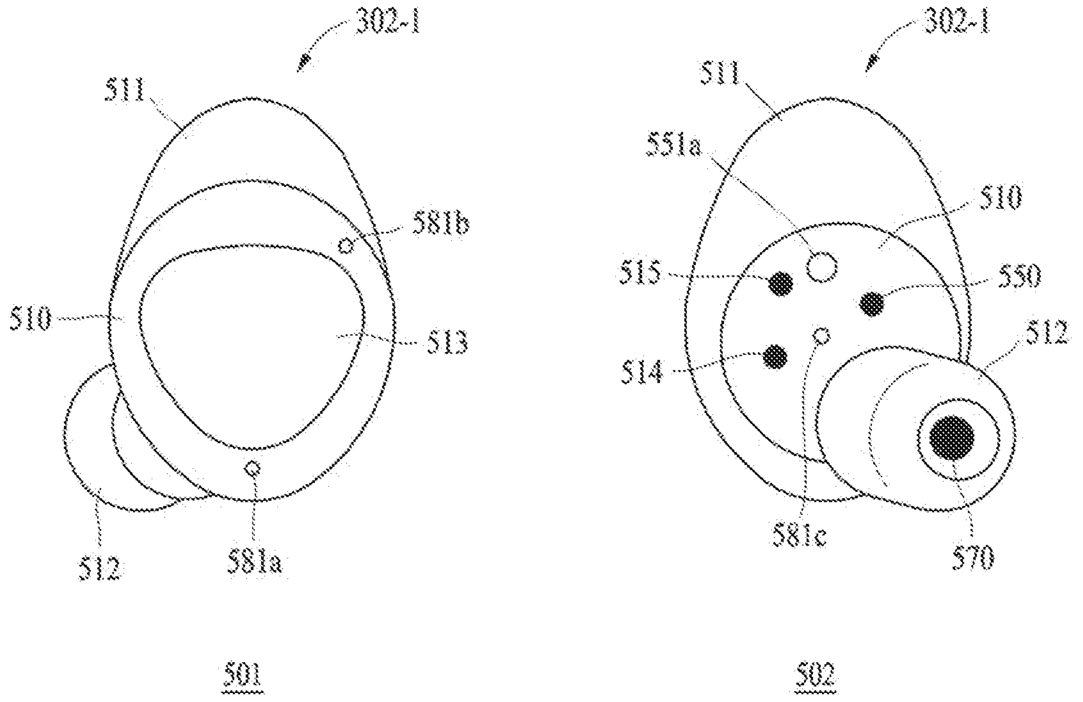
FIG. 5 illustrates front and rear views of a first wireless audio device according to an embodiment.

FIG. 5 illustrates front and rear views of a first wireless audio device according to an embodiment.

The structure of a first wireless audio device 302-1 is described with reference to FIG. 5. For convenience of description, although redundant descriptions are omitted, a second wireless audio device 302-2 may have a structure that is substantially the same as or similar to that of the first wireless audio device 302-1.

In an embodiment, a reference numeral 501 shows the front view of the first wireless audio device 302-1. The first wireless audio device 302-1 may include a housing 510. The housing 510 may form at least a part of the exterior of the first wireless audio device 302-1. The first wireless audio device 302-1 may include a button 513 and first and second microphones 581*a* and 581*b*, respectively, on a first surface (e.g., the surface facing the outside of the ear when worn) of the housing 510. The button 513 may be configured to receive a user input (e.g., a touch input or a push input). The first microphone 581*a* and the second microphone 581*b* may be included in the audio reception circuit 581 of FIG. 4. The first microphone 581*a* and the second microphone 581*b* may sense a sound or acoustic information in a direction toward the outside of a user when the first wireless audio device 302-1 is worn by the user. The first microphone 581*a* and the second microphone 581*b* may refer to external microphones.

The first microphone 581*a* and the second microphone 581*b* may detect a sound outside the housing 510. For example, the first microphone 581*a* and the second microphone 581*b* may detect a sound generated around the first wireless audio device 302-1. The sound of the surrounding environment sensed by the first wireless audio device 302-1 may be output through a speaker 570. In an embodiment, the first microphone 581*a* and the second microphone 581*b* may be microphones for sound pickup for a noise canceling function (e.g., active noise cancellation (ANC)) of the first wireless audio device 302-1. In addition, the first microphone 581*a* and the second microphone 581*b* may be microphones for sound pickup for an ambient sound listening function (e.g., a transparency function or an ambient recognition function) of the first wireless audio device 302-1. For example, the first microphone 581*a* and the second microphone 581*b* may include various types of microphones including an electronic condenser microphone (ECM) and a micro electro mechanical system (MEMS) microphone. A wing tip 511 may couple to the circumference of the housing 510. At least a portion of the wing tip 511 may be formed of an elastic material. The wing tip 511 may detach from the housing 510 or attach to the housing 510. The wing tip 511 may improve wearability of the first wireless audio device 302-1. In one or more examples, an ambient sound may be noise that surrounds a person in a given environment that is secondary to the sound that the person is primarily monitoring or focused on.

According to an embodiment, a reference numeral 502 illustrates the rear view of the first wireless audio device 302-1. The first wireless audio device 302-1 may include a first electrode 514, a second electrode 515, a proximity sensor 550, a third microphone 581*c*, and the speaker 570 on a second surface (e.g., the surface facing the user when worn) of the housing 510. The speaker 570 may be included in the audio output circuit 571 of FIG. 4. The speaker 570 may convert an electrical signal into a sound signal. The speaker 570 may output a sound to the outside of the first wireless audio device 302-1. For example, the speaker 570 may convert an electrical signal into a sound and output the sound that the user may audibly recognize. At least a portion of the speaker 570 may be inside the housing 510. The speaker 570 may couple to an ear tip 512 through one end of the housing 510. The ear tip 512 may be formed in a cylindrical shape with a hollow inside. For example, when the ear tip 512 couples to the housing 510, a sound (audio) output from the speaker 570 may be transmitted to an external object (e.g., a user) through the hollow of the ear tip 512.

According to an embodiment, the first wireless audio device 302-1 may include a sensor 551*a* (e.g., an acceleration sensor, a bone conduction sensor, and/or a gyro sensor) on the second surface of the housing 510. The position and shape of the sensor 551*a* shown in FIG. 5 is one or more examples and the embodiments hereof are not limited thereto. For example, the sensor 551*a* may be inside the housing 510 and may not be exposed to the outside. When the first wireless audio device 302-1 is worn by a wearer, the sensor 551*a* may be at a position where the sensor 551 may contact the wearer's ear or at a position of a portion of the housing 510 that contacts the wearer's ear.

According to an embodiment, the ear tip 512 may be formed of an elastic material (or a flexible material). The ear tip 512 may support the first wireless audio device 302-1 to be closely inserted into the user's ear. For example, the ear tip 512 may be formed of a silicon material. At least one area of the ear tip 512 may deform according to the shape of an external object (e.g., the shape of an ear kernel). According to various embodiments, the ear tip 512 may be formed by a combination of at least two of silicon, foam, and plastic materials. For example, the area of the ear tip 512, which is inserted into and in contact with the user's ear, may be formed of a silicon material and the area of the ear tip 512, which is inserted into the housing 510, may be formed of a plastic material. The ear tip 512 may detach from the housing 510 or attach to the housing 510. The first electrode 514 and the second electrode 515 may connect to an external power source (e.g., a case) and receive an electrical signal from the external power source. The proximity sensor 550 may be used to detect the wearing state of the user. The proximity sensor 550 may be inside the housing 510. At least a portion of the proximity sensor 550 may be exposed to the exterior of the first wireless audio device 302-1. The first wireless audio device 302-1 may determine whether the user is wearing the first wireless audio device 302-1 based on data measured by the proximity sensor 550. For example, the proximity sensor 550 may include an infrared (IR) sensor. The IR sensor may detect whether the housing 510 contacts the user's body. The first wireless audio device 302-1 may determine whether the user wears the first wireless audio device 302-1 based on the detection of the IR sensor. The proximity sensor 550 may not be limited to an IR sensor and may be implemented by using various types of sensors (e.g., an acceleration sensor or a gyro sensor). The third microphone 581*c* may detect sound in a direction toward the user when the first wireless audio device 302-1 is worn by the user. The third microphone 581*c* may refer to an internal microphone.

Figure 6:
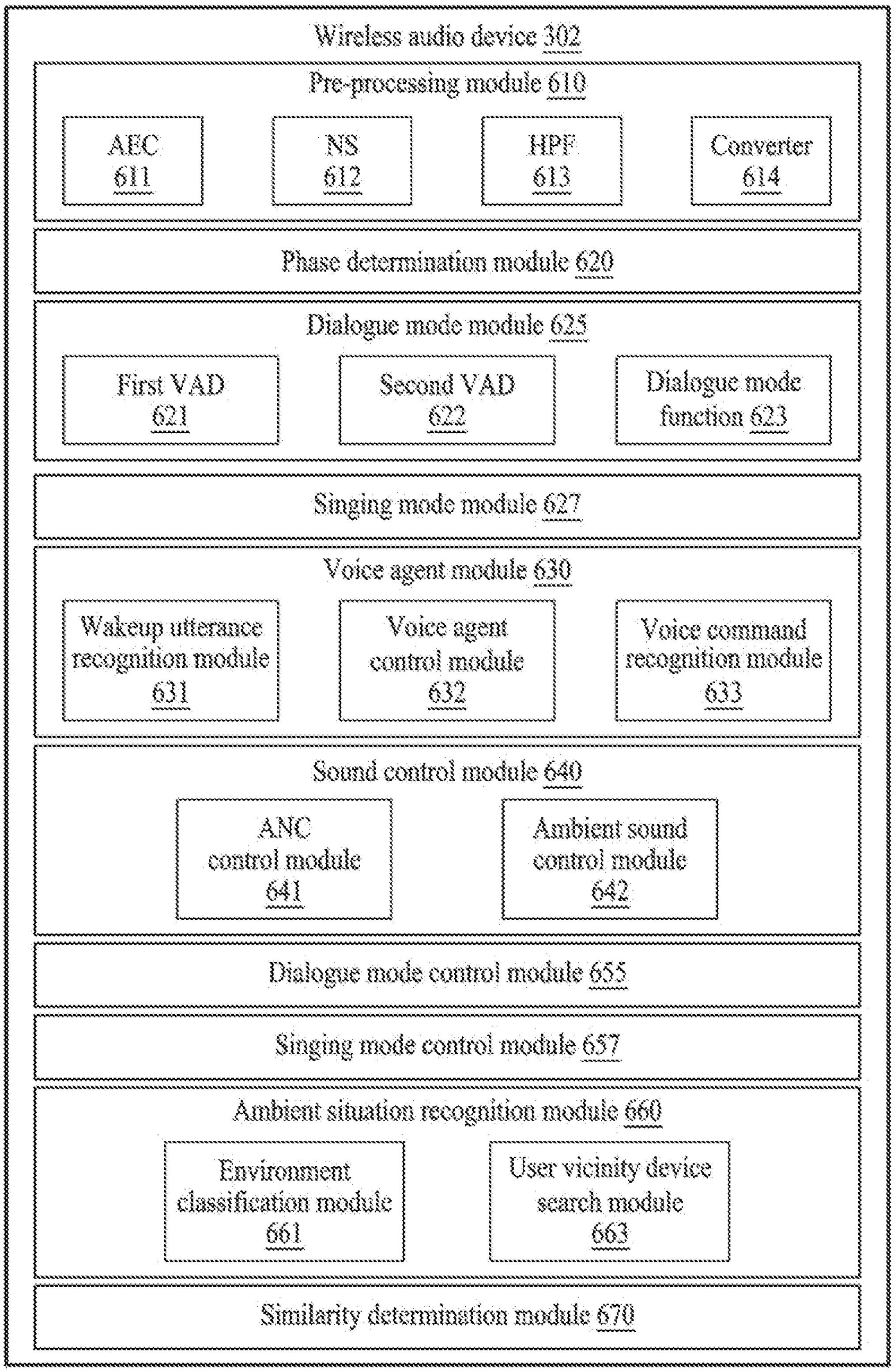
FIG. 6 is a block diagram illustrating a wireless audio device according to an embodiment.

FIG. 6 is a block diagram illustrating a wireless audio device according to an embodiment.

Referring to FIG. 6, according to an embodiment, components of a wireless audio device 302 may include software modules. For example, the components of the wireless audio device 302 may be implemented by a first wireless audio device (e.g., the first wireless audio device 302-1 of FIGS. 3 to 5) or a second wireless audio device (e.g., the second wireless audio device 302-2 of FIGS. 3 and 4). As understood by one of ordinary skill in the art, one or more of the components illustrated in FIG. 6 may be omitted. At least some of the components may be implemented as a single software module. The components may be logically classified. Any program, thread, application, or code performing the same function as the components may correspond to the components.

Figure 7:
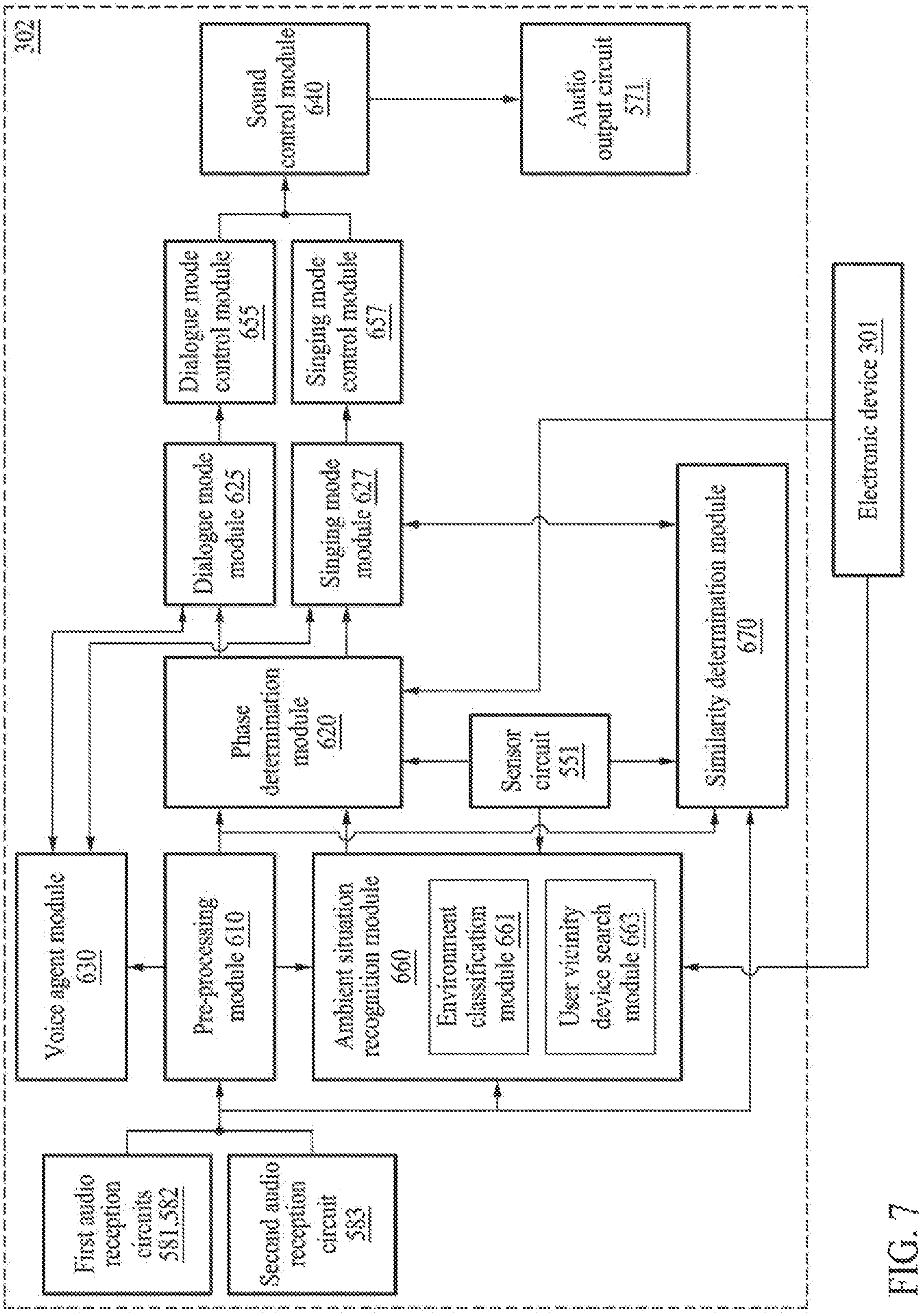
FIG. 7 is a block diagram illustrating a configuration of a wireless audio device according to an embodiment.

According to an embodiment, a pre-processing module 610 may perform preprocessing on audio (or an audio signal) received by using a first audio reception circuit (e.g., the audio reception circuit 581 or 582 of FIG. 5) and a second audio reception circuit (e.g., a second audio reception circuit 583 of FIG. 7). The second audio reception circuit 583 may be included in a wireless audio device (e.g., the first wireless audio device 302-1 and the second wireless audio device 302-2 of FIG. 5). The second audio reception circuit 583 may receive an audio signal (e.g., a reference signal) from an electronic device (e.g., the electronic device 301 of FIG. 5). A reference signal may correspond to media played on the electronic device 301. For example, the pre-processing module 610 may cancel the echo of an obtained audio signal using an acoustic echo canceller (AEC) 611. The pre-processing module 610 may reduce the noise of the obtained audio signal using noise suppression (NS) 612. The pre-processing module 610 may reduce the signal of a designated band of the obtained audio signal using a high pass filter (HPF) 613. The pre-processing module 610 may change the sampling rate of an audio input signal using a converter 614. For example, the converter 614 may be configured to perform down-sampling or up-sampling of the audio input signal. The pre-processing module 610 may selectively apply, to an audio signal, at least one of the AEC 611, the NS 612, the HPF 613, and the converter 614.

According to an embodiment, a phase determination module 620 may determine an operating mode of the first and second wireless audio devices 302-1 and 302-2. For example, the phase determination module 620 may determine the first and second wireless audio devices 302-1 and 302-2 to be entered into one of a first mode change phase and a second mode change phase based on one or more of information related to the electronic device 301 and whether media is played on the electronic device 301. The information related to the electronic device 301 may include one or more of environment information of the electronic device 301, position information of the electronic device 301, and information about a device around the electronic device 301. For example, the environment information may indicate whether a user is indoors or outdoors, or whether the user is in a crowded public space. The information about the device around the electronic device 301 may indicate the type of the device as well as the operating capabilities of the device.

According to an embodiment, the first mode change phase may be to determine to change the operation mode of the first and second wireless audio devices 302-1 and 302-2 into one of a singing mode and a dialogue mode. According to an embodiment, the second mode change phase may be to determine to change the operation mode of the first and second wireless audio devices 302-1 and 302-2 to the dialogue mode.

According to an embodiment, a dialogue mode module 625 may determine to activate and deactivate the dialogue mode. For example, the dialogue mode module 625 may detect whether a wearer (e.g., user) of the wireless audio device 302 utters one or more speech words or phrases by using a first VAD 621. The dialogue mode module 625 may use a second VAD 622 to detect whether the wearer and someone else (e.g., referred to as an outsider) utter one or more speech words or phrases. The dialogue mode module 625 may identify and/or specify an utterance section of the wearer through the first VAD 621. In one or more examples, the utterance section may correspond to a portion of audio data that includes one or more speech words or phrases. The dialogue mode module 625 may identify and/or specify the utterance section of the outsider through the first VAD 621 and the second VAD 622. For example, the dialogue mode module 625 may identify and/or specify the utterance section of the outsider by excluding a section in which the wearer's utterance is identified through the first VAD 621 from a section in which an utterance is identified through the second VAD 622. The dialogue mode module 625 may use the first VAD 621, the second VAD 622, and a dialogue mode function 623 to determine whether to activate or deactivate a voice agent.

According to an embodiment, the dialogue mode module 625 may detect whether the user and the outsider utter by using the first VAD 621 and the second VAD 622. In an embodiment, the dialogue mode module 625 may execute at least one of the first VAD 621 and the second VAD 622 using an audio signal preprocessed by the pre-processing module 610 or an audio signal not processed by the pre-processing module 610. Referring to FIG. 4, the wireless audio device 302 may receive an audio signal using the audio reception circuits 581 and 582. The wireless audio device 302 may detect the movement of the wireless audio device 302 using the sensor circuits 551 and 552 (e.g., a motion sensor, an acceleration sensor, and/or a gyro sensor). For example, when an audio signal (e.g., a voice signal) having a designated magnitude that is greater than or equal to a threshold is detected in a designated band (e.g., a human voice range), the wireless audio device 302 may detect a voice signal include within the audio signal. When a designated movement is sensed simultaneously or substantially simultaneously while the voice signal is being sensed, the wireless audio device 302 may detect the user's utterance (e.g., the wearer's utterance) based on the voice signal. For example, the designated movement may be movement detected by the wireless audio device 302 due to the wearer's utterance of the wireless audio device 302. For example, movement caused by the wearer's utterance may be transmitted to a motion sensor, an acceleration sensor, and/or a gyro sensor in the form of movement or vibration. Movement caused by the wearer's utterance may be introduced into the motion sensor, the acceleration sensor, and/or the gyro sensor in a form similar to that of an input of a bone conduction microphone. The designated movement may correspond to a movement in facial expressions or a change in body position while a person is speaking. The wireless audio device 302 may obtain information about an activation time and an end time of the wearer's utterance based on designated movement and a voice signal. In the case of a voice signal being sensed, when no designated movement is sensed simultaneously or substantially simultaneously, the wireless audio device 302 may detect the utterance of an outsider (e.g., a person (e.g., a stranger or the other party) other than the wearer) based on the voice signal. The wireless audio device 302 may obtain information about the activation start time and activation end time of the outsider's utterance based on designated movement and a voice signal. The dialogue mode module 625 may store information about the activation start time and the activation end time of the user's utterance or the outsider's utterance in a memory (e.g., the memories 531 and 532 of FIG. 4) and may determine to activate or deactivate a dialogue mode based on the information stored in the memories 531 and 532.

For example, the operation of the first VAD 621 and the second VAD 622 may be a serial process. When a voice signal is detected by using the second VAD 622, the wireless audio device 302 may detect movement using a motion sensor (e.g., an acceleration sensor and/or a gyro sensor), thereby identifying whether the voice signal corresponds to the user's utterance.

For example, operation of the first VAD 621 and the second VAD 622 may be a parallel process. For example, the first VAD 621 may be configured to detect the user's utterance independently from the second VAD 622. The second VAD 622 may be configured to detect a voice signal regardless of whether the user utters.

For example, the wireless audio device 302 may use different microphones to detect the user's utterance and an outsider's utterance. The wireless audio device 302 may use an external microphone (e.g., the first microphone 581*a* and the second microphone 581*b* of FIG. 5) to detect the outsider's utterance. The wireless audio device 302 may use an internal microphone (e.g., the third microphone 581*c* of FIG. 5) to detect the user's utterance. In the case of using the internal microphone, the electronic device 302 may determine whether the wearer utters based on a voice signal and movement information based on the internal microphone. The wireless audio device 302 may determine whether the wearer utters based on a voice signal introduced through a sensor input in order to detect the user's utterance. A signal introduced into a sensor input may include at least one of an acceleration sensor input and a gyro sensor input.

According to an embodiment, the dialogue mode module 625 may determine to activate a dialogue mode using the first VAD 621 and/or the second VAD 622. When the electronic device 301 is in a dialogue mode off state, the dialogue mode module 625 may determine whether to activate the dialogue mode. For example, the dialogue mode module 625 may determine to activate the dialogue mode when the user's utterance is maintained for a designated time period (e.g., L frames or more, wherein L is a positive integer). In one or more examples, the dialogue mode module 625 may determine to activate the dialogue mode when the other person's utterance is maintained for a designated time period after the user's utterance is deactivated.

According to an embodiment, the dialogue mode module 625 may determine whether to maintain or deactivate the dialogue mode using the first VAD 621 and/or the second VAD 622. In a dialogue mode on state, the dialogue mode module 625 may determine whether to maintain or deactivate the dialogue mode. For example, during the dialogue mode, the dialogue mode module 625 may determine to deactivate the dialogue mode when no voice signal is detected for a designated time period. During the dialogue mode, the dialogue mode module 625 may determine to maintain the dialogue mode when a voice signal is detected within a designated time period from the deactivation of a previous voice signal.

According to an embodiment, the dialogue mode module 625 may determine to activate and/or deactivate the dialogue mode based on the dialogue mode function 623. The dialogue mode function 623 may detect the activation and/or deactivation of the dialogue mode based on a user input. For example, the user input may include a voice command, touch input, or button input of the user.

According to an embodiment, the dialogue mode module 625 may determine the length of a designated time period based on ambient sounds. For example, the dialogue mode module 625 may determine the length of the designated time period based on at least one of a signal-to-noise ratio (SNR) value, the type of noise, and a sensitivity to background noise of a sound obtained by using an external microphone. For example, in a noisy environment, the dialogue mode module 625 may be more sensitive to background noise and therefore, may increase the length of the designated time period.

According to an embodiment, the dialogue mode module 625 may determine to activate and/or deactivate the dialogue mode based on a voice command of the user. In an embodiment, a voice agent module 630 may detect the user's voice command instructing that the dialogue mode be activated and may transmit, to the dialogue mode function 623, information instructing activation of the dialogue mode in response to the detection of the voice command. The voice command instructing that the dialogue mode be activated may include a wake-up utterance (e.g., Hi, Bixby) and a voice command for waking up a voice agent. For example, the voice command may have a form, such as "Hi, Bixby, activate the dialogue mode!". In one or more examples, the voice command instructing that the dialogue mode be activated may have a form, such as "Activate the dialogue mode!" that does not include a wake-up utterance. When the dialogue mode function 623 receives information instructing that the dialogue mode be activated from the voice agent module 630, the dialogue mode module 625 may determine to activate the dialogue mode. In an embodiment, the voice agent module 630 may detect the user's voice command instructing that the dialogue mode be deactivated and may transmit, to the dialogue mode function 623, information instructing that the dialogue mode be deactivated in response to detecting the voice command. For example, the voice command instructing deactivation of the dialogue mode may include a wake-up utterance and a voice command for waking up a voice agent. The voice command may have a form, such as "Hi, Bixby, deactivate the dialogue mode!". For example, the voice command instructing that the dialogue mode be deactivated may have a form, such as "Deactivate the dialogue mode!", that does not include a wake-up utterance. When the dialogue mode function 623 receives, from the voice agent module 630, information instructing that the dialogue mode be deactivated, the dialogue mode module 625 may determine to deactivate the dialogue mode.

According to an embodiment, the dialogue mode module 625 may determine to activate and/or deactivate the dialogue mode based on the user's touch input. For example, the electronic device 301 may provide an interface for controlling the dialogue mode of the wireless audio device 302. Through the interface, the electronic device 301 may receive a user input for setting the activation or deactivation of the dialogue mode. When the electronic device 301 receives a user input instructing that the dialogue mode be activated, the electronic device 301 may transmit, to the wireless audio device 302, a signal instructing that the dialogue mode be activated. When the dialogue mode function 623 receives, from the signal, information instructing that the dialogue mode be activated, the dialogue mode module 625 may determine to activate the dialogue mode. When a user input instructing that the dialogue mode be deactivated is received through an interface, the electronic device 301 may transmit, to the wireless audio device 302, a signal instructing that the dialogue mode be deactivated. When the dialogue mode function 623 receives, from the signal, information instructing that the dialogue mode be deactivated, the dialogue mode module 625 may determine to deactivate the dialogue mode.

According to an embodiment, when the dialogue mode module 625 determines to activate or deactivate the dialogue mode, the wireless audio device 302 may transmit, to the electronic device 301, a signal indicating that the dialogue mode has been determined to be activated or deactivated. The electronic device 301 may provide information indicating that the dialogue mode has been determined to be activated or deactivated through an interface for controlling the dialogue mode of the wireless audio device 302.

According to an embodiment, the dialogue mode module 625 may determine to activate and/or deactivate the dialogue mode based on the user's button input. For example, the wireless audio device 302 may include at least one button (e.g., the button 513 of FIG. 5). The dialogue mode function 623 may be configured to detect a designated input to a button (e.g., a double tap or a long press). When an input instructing that the dialogue mode be activated is received through the button, the dialogue mode module 625 may determine to activate the dialogue mode. When the input instructing that the dialogue mode be deactivated is received through the button, the dialogue mode module 625 may determine to deactivate the dialogue mode. In one or more examples, the input command may be ignored if the input command corresponds the current state of the dialogue mode. For example, if the dialogue mode is in the activated state, and an activate dialogue input command is received, the input command may be ignored.

According to an embodiment, the dialogue mode function 623 may be configured to interact with the voice agent module 630. For example, the dialogue mode function 623 may receive, from the voice agent module 630, information indicating whether an utterance is for a voice agent call. For example, the first VAD 621 may detect the wearer's utterance maintained for a designated time or more. In this case, the dialogue mode module 625 may use the dialogue mode function 623 to identify whether the wearer's utterance is for a voice agent call. When, using the voice agent module 630, the dialogue mode function 623 confirms that the voice agent call has been performed by the wearer's utterance, the dialogue mode module 625 may ignore the wearer's utterance. For example, even when the wearer's utterance lasts for a designated time or more, the dialogue mode module 625 may not determine to activate the dialogue mode based only with the wearer's utterance. For example, the voice agent module 630 may identify a voice command instructing that the dialogue mode be activated from the wearer's utterance. In this case, the voice agent module 630 may transfer, to the dialogue mode module 625, a signal instructing that the dialogue mode be activated. The dialogue mode module 625 may determine to activate the dialogue mode. That is, in this case, the dialogue mode module 625 may determine to activate the dialogue mode based on the instruction of the voice agent module 630 instead of the length of the utterance itself.

According to an embodiment, the dialogue mode module 625 may determine to deactivate the dialogue mode based on the operating time of the dialogue mode. For example, when a predetermined time elapses after the dialogue mode is turned on, the dialogue mode module 625 may determine to deactivate the dialogue mode.

According to an embodiment, a singing mode module 627 may determine to activate and deactivate a singing mode. The singing mode module 627 may determine to activate and deactivate the singing mode based on whether an analysis result of an audio signal received by the first and second wireless audio devices 302-1 and 302-2 satisfies one or more activation conditions of the singing mode in the first mode change phase. The one or more activation conditions of the singing mode may be classified into a first sensitivity level, a second sensitivity level, and a third sensitivity level according to the sensitivity level of the electronic device 301.

According to an embodiment, the one of more activation conditions according to the first sensitivity level may include conditions about whether a singing voice in ambient sounds is continuously detected for a predetermined time. The one of more activation conditions according to the second sensitivity level may include conditions about acoustic similarity between media and a singing voice included in ambient sounds. The media and the ambient sounds may be included in an audio signal. The one of more activation conditions according to the third sensitivity level may include conditions about similarity between lyrics included in the singing voice included in the ambient sounds and lyrics included in the media.

According to an embodiment, the one of more activation conditions of the singing mode may include activation conditions according to all levels below the sensitivity level of the electronic device 301. For example, when the sensitivity level of the electronic device 301 is the second sensitivity level, the one of more activation conditions of the singing mode may include activation conditions according to the first sensitivity level and the second sensitivity level. When the sensitivity level of the electronic device 301 is the third sensitivity level, the one of more activation conditions of the singing mode may include activation conditions according to the first sensitivity level, the second sensitivity level, and the third sensitivity level.

According to an embodiment, the singing mode module 627 may determine to activate and/or deactivate the dialogue mode. The singing mode module 627 may detect the activation and/or deactivation of the singing mode based on a user input. For example, the user input may include a voice command, a touch input, or a button input of the user.

According to an embodiment, the singing mode module 627 may determine the length of a designated time period based on ambient sounds. For example, the singing mode module 627 may determine the length of the designated time period based on at least one of an SNR value, the type of noise, and the sensitivity to background noise of a sound obtained by using an external microphone. For examples, in a noisy environment, the singing mode module 627 may be more sensitive and therefore, increase the length of the designated time period.

According to an embodiment, the singing mode module 627 may determine to activate and/or deactivate the singing mode based on a voice command of the user. In an embodiment, the voice agent module 630 may detect the voice command of the user instructing that the singing mode be activated and may transfer, to the singing mode module 627, information instructing that the singing mode be activated in response to detection of the voice command. The voice command instructing that the singing mode be activated may include a wake-up utterance (e.g., Hi, Bixby) and a voice command for waking up a voice agent. For example, the voice command may have a form such as "Hi, Bixby, activate the singing mode!". In one or more examples, a voice command instructing that the singing mode be activated may have a form, such as "Activate the singing mode!", that does not include a wake-up utterance. When the singing mode module 627 receives information instructing that the singing mode be activated from the voice agent module 630, the singing mode module 627 may determine to activate the singing mode. In an embodiment, the voice agent module 630 may detect the voice command of the user instructing that the singing mode be deactivated and transmit, to the singing mode module 627, information instructing that the singing mode be deactivated in response to detection of the voice command. For example, the voice command instructing that the singing mode be deactivated may include a wake-up utterance and a voice command for waking up a voice agent. The voice command may have a form, such as "Hi, Bixby, deactivate the singing mode!". For example, the voice command instructing that the singing mode be deactivated may have a form, such as "Deactivate the singing mode!", that does not include a wake-up utterance. When the singing mode module 627 receives, from the voice agent module 630, information instructing that the singing mode be deactivated, the singing mode module 627 may determine to deactivate the singing mode.

According to an embodiment, the singing mode module 627 may determine to activate and/or deactivate the singing mode based on a touch input of the user. For example, the electronic device 301 may provide an interface for controlling the singing mode of the wireless audio device 302. Through the interface, the electronic device 301 may receive a user input for setting the activation or deactivation of the singing mode. When the user input instructing that the singing mode be activated is received, the electronic device

301 may transmit, to the wireless audio device 302, a signal instructing that the singing mode be activated. When the singing mode module 627 receives information instructing that the singing mode be activated from the signal, the singing mode module 627 may determine to activate the singing mode. When the user input instructing that the singing mode be deactivated is received through an interface, the electronic device 301 may transmit, to the wireless audio device 302, a signal instructing that the singing mode be deactivated. When the singing mode module 627 receives, from the signal, information instructing that the singing mode be deactivated, the singing mode module 627 may determine to deactivate the singing mode.

According to an embodiment, when the singing mode module 627 determines to activate or deactivate the singing mode, the wireless audio device 302 may transmit, to the electronic device 301, a signal indicating that the singing mode has been determined to be activated or deactivated. The electronic device 301 may provide information obtained from the signal and indicating that the singing mode has been determined to be activated or deactivated through an interface for controlling the singing mode of the wireless audio device 302.

According to an embodiment, the singing mode module 627 may determine to activate and/or deactivate the singing mode based on a button input of the user. For example, the wireless audio device 302 may include at least one button (e.g., the button 513 of FIG. 5). The singing mode module 627 may be configured to detect a designated input to a button (e.g., a double tap or a long press). When an input instructing that the singing mode be activated is received through the button, the singing mode module 627 may determine to activate the singing mode. When the input instructing that the singing mode be deactivated is received through the button, the singing mode module 627 may determine to deactivate the singing mode.

According to an embodiment, the singing mode module 627 may be configured to interact with the voice agent module 630. For example, the singing mode module 627 may receive, from the voice agent module 630, information indicating whether an utterance is for a voice agent call. For example, the first VAD 621 may detect the wearer's utterance that is maintained for a designated time period or more. In this case, the singing mode module 627 may identify whether the wearer's utterance is for a voice agent call. When the singing mode module 627 confirms that the voice agent call has been performed by the utterance, using the voice agent module 630, the singing mode module 627 may ignore the wearer's utterance. For example, even when a singing voice included in the wearer's utterance lasts for a designated time or more, the singing mode module 627 may not determine to activate the singing mode based only on the wearer's utterance. For example, the voice agent module 630 may identify a voice command instructing that the singing mode be activated from the wearer's utterance. In this case, the voice agent module 630 may transmit, to the singing mode module 627, a signal instructing that the singing mode be activated and the singing mode module 627 may determine to activate the singing mode. In this case, the singing mode module 627 may determine to activate the singing mode based on the instruction of the voice agent module 630 instead of whether the one or more activation conditions of the singing mode are satisfied.

According to an embodiment, the singing mode module 627 may determine to deactivate the singing mode in the singing mode. For example, the singing mode module 627 may determine to deactivate the singing mode when the analysis result of an audio signal received by the first and second wireless audio devices 302-1 and 302-2 in the singing mode no longer satisfies the one of more activation conditions of the singing mode. In one or more examples, the singing mode module 627 may determine to deactivate the singing mode based on information related to the electronic device 301 and whether media are played. In this case, the singing mode module 627 may determine to deactivate the singing mode by determining that media are no longer played on the electronic device 301 or that the singing mode is not needed according to the information related to the electronic device 301.

According to an embodiment, the first and second wireless audio devices 302-1 and 302-2 may track a singing voice included in ambient sounds in the singing mode by using the singing mode module 627 and may, at the same time, provide the user with the singing voice and guide about media. For example, the first and second wireless audio devices 302-1 and 302-2 may provide guide information about the media to the user when the user selects to provide a song guide or when the similarity between the singing voice and the media is low. As understood by one of ordinary skill in the art, a singing voice may correspond to a voice singing a melody or a harmony compared to a talking voice in which speech is uttered during a dialogue. Accordingly, a singing voice may have a higher frequency than a talking voice. The guide information about the media may include main melody information to sing along with the media (e.g., a song), a beat, or lyrics to be played in the next measure of a song. The guide information about the media may be output in the audio at low volume based on TTS generation through the wireless audio device 302 or may be displayed as visual information on the screen of the electronic device 301.

According to an embodiment, the voice agent module 630 may include a wakeup utterance recognition module 631 and a voice agent control module 632. In an embodiment, the voice agent module 630 may further include a voice command recognition module 633. The wakeup utterance recognition module 631 may obtain an audio signal using the audio reception circuits 581 and 582 and may recognize a wakeup utterance (e.g., Hi, Bixby) from the audio signal. When a designated voice command is recognized, the wakeup utterance recognition module 631 may control a voice agent using the voice agent control module 632. For example, the voice agent control module 632 may transfer a received voice signal to the electronic device 301 and receive a task or command corresponding to the voice signal from the electronic device 301. For example, when a voice signal instructs that the volume be adjusted, the electronic device 301 may transfer a signal instructing the volume be adjusted to the wireless audio device 302. The voice command recognition module 633 may obtain an audio signal using the audio reception circuits 581 and 582 and may recognize a designated voice command from the audio signal. In an embodiment, the designated voice utterance may include a voice command for controlling a dialogue mode (e.g., activating the dialogue mode or deactivating the dialogue mode). The voice command recognition module 633 may perform a function corresponding to a designated voice command when the voice command recognition module 633 recognizes the designated voice command even without recognizing a wakeup utterance. For example, when the voice command recognition module 633 recognizes the utterance of a designated command, such as "Deactivate the dialogue mode!" or "Deactivate the singing mode!", the voice command recognition module 633 may transmit a signal instructing the electronic device 301 to deactivate the dialogue mode or the singing mode. For example, the voice command recognition module 633 may perform a function corresponding to a designated voice command without interaction with the voice agent. The electronic device 301 may perform control of the sound of the wireless audio device 302 to be described below in response to a signal instructing that a specific mode (e.g., the dialogue mode or the singing mode) be deactivated.

According to an embodiment, the dialogue mode module 625 may transmit determination on the dialogue mode (e.g., deactivation of the dialogue mode or activation of the dialogue mode) to a dialogue mode control module 655. The dialogue mode control module 655 may control functions of the wireless audio device 302 according to activation and/or deactivation of the dialogue mode. For example, the dialogue mode control module 655 may control the output signal of the wireless audio device 302 using a sound control module 640 according to the activation and/or deactivation of the dialogue mode.

According to an embodiment, the singing mode module 627 may transfer the determination about the singing mode (e.g., deactivation of the singing mode or activation of the singing mode) to a singing mode control module 657. The singing mode control module 657 may control functions of the wireless audio device 302 according to the activation and/or deactivation of the singing mode. For example, the singing mode control module 657 may control the output signal of the wireless audio device 302 using the sound control module 640 according to the activation and/or deactivation of the singing mode.

For example, the sound control module 640 may include an ANC control module 641 and an ambient sound control module 642. The ANC control module 641 may be configured to obtain ambient sounds and perform noise cancellation based on the ambient sounds. For example, the ANC control module 641 may obtain ambient sounds using an external microphone and perform noise cancellation using the obtained ambient sounds. The ambient sound control module 642 may be configured to provide ambient sounds to the wearer. For example, the ambient sound control module 642 may be configured to obtain ambient sounds using an external microphone and provide the ambient sounds by outputting the obtained ambient sounds using a speaker of the wireless audio device 302.

According to an embodiment, when the dialogue mode is activated, the dialogue mode control module 655 may control the output signal of the wireless audio device 302 using the sound control module 640. For example, the dialogue mode control module 655 may deactivate ANC and activate ambient sounds in response to the activation of the dialogue mode. In one or more examples, when music is being output by the wireless audio device 302, the dialogue mode control module 655 may reduce the volume level of the music being output at a predetermined rate or more or may set a volume level up to mute, in response to the activation of the dialogue mode. The user of the wireless audio device 302 may hear the ambient sounds more clearly according to the activation of the dialogue mode.

According to an embodiment, when the dialogue mode is deactivated, the dialogue mode control module 655 may control the output signal of the wireless audio device 302 using the sound control module 640. For example, the dialogue mode control module 655 may restore settings for ANC and/or ambient sounds to settings therefor prior to the activation of the dialogue mode and may deactivate the ambient sounds, in response to the deactivation of the dialogue mode. For example, before activating the dialogue mode, the dialogue mode control module 655 may store settings for ANC and/or ambient sounds in the memories 531 and 532. When the dialogue mode is deactivated, the dialogue mode control module 655 may activate or deactivate ANC and/or ambient sounds according to the settings for ANC and/or ambient sounds stored in the memories 531 and 532.

In one or more examples, the dialogue mode control module 655 may restore settings for the output signal of the wireless audio device 302 to settings prior to the activation of the dialogue mode in response to the deactivation of the dialogue mode. For example, when music is being output by the wireless audio device 302 before activation of the dialogue mode, the dialogue mode control module 655 may store settings for a music output signal in the memories 531 and 532. When the dialogue mode is deactivated, the dialogue mode control module 655 may restore settings for a music output signal to the settings for the music output signal stored in the memories 531 and 532. The dialogue mode control module 655 may reduce a media output volume to a designated value or mute the media output volume in the dialogue mode according to the settings. In one or more examples, the music output may be paused when the dialogue mode is activated. In the dialogue mode, the wireless audio device 302 may output a voice agent notification (e.g., a response to the user's utterance) independently from the volume of the dialogue mode. For example, the wireless audio device 302 may output the notification of a voice agent (e.g., a TTS-based response) at a designated volume value in the dialogue mode.

According to an embodiment, the dialogue mode control module 655 may control an output signal using the sound control module 640 during operation of the dialogue mode. For example, the dialogue mode control module 655 may control the intensity of ANC and/or ambient sounds. The dialogue mode control module 655 may amplify the intensity of ambient sounds by controlling the gain value of ambient sounds. The dialogue mode control module 655 may amplify only a section where a voice exists or a frequency band corresponding to the voice in the ambient sounds. In the dialogue mode, the dialogue mode control module 655 may reduce the intensity of ANC. The dialogue mode control module 655 may control the output volume of an audio signal.

Tables 1 and 2 below show examples of sound control of the dialogue mode control module 655 according to the activation (e.g., on) and deactivation (e.g., off) of the dialogue mode.

TABLE 1

| Sound Control | Previous State | Dialogue mode on | Dialogue mode off |
|---|---|---|---|
| ANC | ON | OFF | ON |
| Ambient sounds | OFF | ON | OFF |

Referring to Table 1, the wearer of the wireless audio device 302 may be listening to music using the wireless audio device 302. For example, the wireless audio device 302 may output music while performing ANC. For example, the wireless audio device 302 may output the volume of music at a first volume. According to the activation of the dialogue mode, the dialogue mode control module 655 may activate the ambient sounds and deactivate the ANC. In this case, the dialogue mode control module 655 may decrease the volume of the music being output below a designated value or by as much as a designated rate. For example, the dialogue mode control module 655 may decrease the volume of music being output to a second value in the dialogue mode. According to the deactivation of the dialogue mode, the dialogue mode control module 655 may restore settings related to an output signal. For example, the dialogue mode control module 655 may activate the ANC and deactivate the ambient sounds. In addition, the dialogue mode control module 655 may increase the volume of music being output to the first volume.

TABLE 2

| Sound Control | Previous State | Dialogue mode on | Dialogue mode off |
|---|---|---|---|
| ANC | OFF | OFF | OFF |
| Ambient sounds | OFF | ON | OFF |

Referring to Table 2, the wearer of the wireless audio device 302 may be listening to music using the wireless audio device 302. For example, the wireless audio device 302 may output music without applying ANC. For example, the wireless audio device 302 may output the volume of music at the first value. According to the activation of the dialogue mode, the dialogue mode control module 655 may activate ambient sounds and maintain ANC in a deactivation state. In this case, the dialogue mode control module 655 may decrease the volume of the music being output below a designated value or by as much as a designated rate. For example, the dialogue mode control module 655 may decrease the volume of music being output to the second value in the dialogue mode. According to the deactivation of the dialogue mode, the dialogue mode control module 655 may restore settings related to an output signal. For example, the dialogue mode control module 655 may maintain ANC in the deactivation state and deactivate ambient sounds. In addition, the dialogue mode control module 655 may increase the volume of music being output to the first value.

The examples of Tables 1 and 2 describe that the wireless audio device 302 deactivates ambient sounds when the dialogue mode is not set. However, as understood by one of ordinary skill in the art, the embodiments are not limited to these configurations. For example, even when the dialogue mode is not set, the wireless audio device 302 may activate ambient sounds according to the user's settings.

According to an embodiment, the singing mode module 627 may transmit, to the singing mode control module 657, determination on the singing mode (e.g., deactivation of the singing mode or activation of the singing mode). The singing mode control module 657 may control functions of the wireless audio device 302 according to activation and/or deactivation of the singing mode. For example, the singing mode control module 657 may control the output signal of the wireless audio device 302 using the sound control module 640 according to the activation and/or deactivation of the singing mode.

According to an embodiment, an ambient situation recognition module 660 may obtain an audio signal using an audio reception circuit (e.g., the first audio reception circuit 581 and the second audio reception circuit 582 of FIG. 4), may recognize an ambient situation based on the audio signal and may classify the environment of the ambient situation. The ambient situation recognition module 660 may include an environment classification module 661 and a user vicinity device search module 663. The ambient situation recognition module 660 may obtain at least one of background noise, an SNR, a type of noise from an audio signal, or any other relevant information that indicates an ambient sound. The ambient situation recognition module 660 may further obtain sensor information from a sensor circuit (e.g., the sensor circuits 551 and 552 of FIG. 4). The sensor information may include Wi-Fi information and/or BLE information, and Global Positioning System (GPS) information.

According to an embodiment, the environment classification module 661 may detect an environment based on the intensity, SNR, or type of background noise. For example, the environment classification module 661 may compare the environment information stored in the memories 531 and 532 to at least one of the intensity, SNR, and type of background noise and may calculate environment information of the wireless audio device 302. The type of environment may be indoors, outdoors, public event indoors, public event outdoors, or any other relevant environment known to one or ordinary skill in the art.

According to an embodiment, the user vicinity device search module 663 may use sensor information to calculate information about a device around the wireless audio device (e.g., the first wireless audio device 302-1 and the second wireless audio device 302-2). For example, using the sensor information, the user vicinity device search module 663 may calculate the type and distribution of nearby devices in the environment where the first and second wireless audio devices 302-1 and 302-2 are located. In one or more examples, the user vicinity device search module 663 may obtain user location information of the first and second wireless audio devices 302-1 and 302-2 using the sensor information. The user vicinity device search module 663 may map one or more of environment information corresponding to the utterance, location information, and information about a device around the electronic device 301 to a mode used for an utterance and may analyze the pattern of the mapped mode.

According to an embodiment, in a state in which one of the dialogue mode and the singing mode is activated, the ambient situation recognition module 660 may control an output signal based on an identified environment. The ambient situation recognition module 660 may control ambient sounds based on the intensity and/or SNR of background noise. For example, the ambient situation recognition module 660 may determine overall output of ambient sounds, amplification of a voice band in ambient sounds, or amplification of designated sound (e.g., an alarm or siren) in ambient sounds.

For example, the ambient situation recognition module 660 may determine the intensity of ANC. For example, the ambient situation recognition module 660 may adjust parameters (e.g., coefficients) of a filter for ANC.

According to an embodiment, the ambient situation recognition module 660 may control one of the dialogue mode and the singing mode based on an identified environment. For example, the ambient situation recognition module 660 may activate either the dialogue mode or the singing mode based on the identified environment. When it is determined that the user is in an environment where the user needs to hear ambient sounds, the ambient situation recognition module 660 may activate the dialogue mode using the dialogue mode control module 655 and provide the ambient sounds to the user according to the dialogue mode. For example, when the user is in a dangerous environment (e.g., an environment in which a siren sound is sensed), the ambient situation recognition module 660 may activate the dialogue mode.

According to an embodiment, the electronic device 301 may display, on the display 360, an interface indicating the deactivation or activation of one of the dialogue mode and the singing mode. The electronic device 301 may provide an interface in a manner synchronized with one of the dialogue mode and the singing mode of the wireless audio device 302. When the electronic device 301 determines to deactivate or activate one of the dialogue mode and the singing mode or when the electronic device 301 receives, from the wireless audio device 302, a signal instructing that one of the dialogue mode and the singing mode be activated or deactivated, the electronic device 301 may display an interface. For example, when either one of the dialogue mode and the singing mode is activated, the electronic device 301 may display a first interface including information notifying that one of the dialogue mode and the singing mode has been set. The first interface may include an interface for controlling settings for an output signal in either the dialogue mode or the singing mode. For example, when one of the dialogue mode and the singing mode is deactivated, the electronic device 301 may display a second interface including information indicating that one of the dialogue mode and the singing mode has been deactivated. The electronic device 301 may display the first interface and the second interface on the execution screen of an application (e.g., a wearable application) for controlling the wireless audio device 302.

According to an embodiment, the dialogue mode module 625 may determine to activate or deactivate the dialogue mode further based on whether the user wears the wireless audio device 302. For example, when the wireless audio device 302 is worn by the user, the dialogue mode module 625 may activate the dialogue mode based on an utterance of the user (e.g., the wearer) or a user input. When the wireless audio device 302 is not worn by the user, the dialogue mode module 625 may not activate the dialogue mode even when the user's utterance is detected.

For example, each of the first wireless audio device 302-1 and the second wireless audio device 302-2 may include components of the wireless audio device 302 shown in FIG. 5. Each of the first wireless audio device 302-1 and the second wireless audio device 302-2 may be configured to determine whether to activate one of the dialogue mode and the singing mode. According to an embodiment, when the first wireless audio device 302-1 or the second wireless audio device 302-2 determines to activate one of the dialogue mode and the singing mode, the first wireless audio device 302-1 and the second wireless audio device 302-2 may be configured to operate in one of the dialogue mode and the singing mode. For example, the first wireless audio device 302-1 or the second wireless audio device 302-2 that determines to activate one of the dialogue mode and the singing mode may be configured to transmit, to another wireless audio device and/or the electronic device 301, a signal instructing that one of the dialogue mode and the singing mode be activated. According to an embodiment, when both the first wireless audio device 302-1 and the second wireless audio device 302-2 determine to activate the dialogue mode, the first wireless audio device 302-1 and the second wireless audio device 302-2 may be configured to operate in one of the dialogue mode or the singing mode. For example, the first wireless audio device 302-1 or the second wireless audio device 302-2 that has determined to activate one of the dialogue mode and the singing mode may check which one of the dialogue mode and the signing mode another wireless audio device determines to activate. When the first and second wireless audio device 302-1 and 302-2 determine to activate one of the dialogue mode and the singing mode, the first and second wireless audio devices 302-1 and 302-2 may operate in the one mode, which is the dialogue mode or the singing mode. In one or more examples, the first wireless audio device 302-1 or the second wireless audio device 302-2 that has determined to activate one of the dialogue mode and the singing mode may transmit, to the electronic device 301, a signal instructing that one of the dialogue mode and the singing mode be activated. When the electronic device 301 receives the signal instructing that one of the dialogue mode and the singing mode be activated from both the first wireless audio device 302-1 and the second wireless audio device 302-2 within a designated time, the electronic device 301 may transmit a signal instructing the first wireless audio device 302-1 and the second wireless audio device 302-2 to operate in one of the dialogue mode and the singing mode.

According to an embodiment, a similarity determination module 670 may detect information about a singing voice in ambient sounds included in an audio signal based on features of the singing voice. The similarity determination module 670 may extract a main part of a signal for the ambient sounds included in the audio signal and a main part of a signal for a reference signal corresponding to media included in the audio signal. In one or more examples, the main part of a signal may be a part of one or more ambient sounds that has a highest SNR or is included within a predetermined frequency region. Based on the main part of signals and the singing voice, the similarity determination module 670 may calculate acoustic similarity and lyrics similarity between the media and the singing voice. In the case of the similarity determination module 670 outputting similarity to the singing mode module 627, when the similarity exceeds a predetermined threshold, the similarity determination module 670 may determine to activate the singing mode.

A method of determining the activation, maintenance, and/or deactivation of one of the dialogue mode and the singing mode may refer to a description to be provided below with reference to FIGS. 7 to 12B.

FIG. 7 is a block diagram illustrating a configuration of a wireless audio device according to an embodiment.

Referring to FIG. 7, according to an embodiment, a wireless audio device 302 may include a sensor circuit (e.g., the sensor circuits 551 and 552 of FIG. 4), an audio output circuit (e.g., the audio output circuits 571 and 572 of FIG. 4), an audio reception circuit (e.g., the first audio reception circuits 581 and 582 and the second audio reception circuit 583 of FIG. 4), a pre-processing module 610, a phase determination module 620, a dialogue mode module 625, a singing mode module 627, a voice agent module 630, a sound control module 640, a dialogue mode control module 655, a singing mode control module 657, an ambient situation recognition module 660, and a similarity determination module 670.

According to an embodiment, the wireless audio device 302 may provide a plurality of operating modes to a user of the wireless audio device 302 based on the components of the wireless audio device 302. The plurality of operating modes may include a normal mode, a dialogue mode, and a singing mode. The plurality of operating modes may be selectively activated and two or more operation modes may not be activated at the same time.

According to an embodiment, the normal mode may be the default mode of the wireless audio device 302. The dialogue mode may be a mode for outputting at least one or more ambient sounds included in an audio signal detected by the wireless audio device 302 while the user is using (e.g., wearing) the wireless audio device 302 in order to smoothly conduct a dialogue with a person other than the user. The singing mode may be a mode for outputting at least one or more ambient sounds and media included in an audio signal in order to optimally help the user's experience of enjoying music. In one or more examples, the user may configured the wireless audio device 302 such that one of the singing mode and the dialogue mode is the default mode.

According to an embodiment, an audio reception circuit (e.g., the audio reception circuits 581 and 582 and the second audio reception circuit 583) may detect an audio signal. The audio signal may include ambient sounds of the wireless audio device 302 and a reference signal corresponding to media played on the electronic device 301. For example, the first audio reception circuits 581 and 582 may receive ambient sounds (e.g., a dialogue between the user and a person other than the user or a singing voice) of the electronic device 301 and the second audio reception circuit 583 may receive a reference signal from the electronic device 301.

According to an embodiment, the pre-processing module 610 may perform preprocessing on the detected audio signal using an audio reception circuit (e.g., the first audio reception circuits 581 and 582 and the second audio reception circuit 583) and thus improve distortion of the audio signal.

According to an embodiment, the phase determination module 620 may obtain whether the electronic device 301 plays media. For example, the phase determination module 620 may obtain whether media is played on the electronic device 301, the type of media, and whether there are lyrics through media player app information received from the electronic device 301. In one or more examples, the phase determination module 620 may obtain whether media is played based on the reference signal. The phase determination module 620 may determine that media is being played when the reference signal is greater than or equal to a predetermined magnitude for a predetermined time or more.

According to an embodiment, the phase determination module 620 may obtain information related to the electronic device 301 from one or more of the ambient situation recognition module 660 and a sensor circuit 551. The information related to the electronic device 301 may include one or more of environment information of the electronic device 301, location information of the electronic device 301, and information about a device around the electronic device 301.

According to an embodiment, the environment information may be generated based on the intensity of background noise, an SNR, or the type of background noise obtained by the ambient situation recognition module 660 (e.g., the environment classification module 661) from the audio signal and the preprocessed audio signal.

According to an embodiment, the location information of the electronic device 301 and the information about a device around the electronic device 301 may be obtained from sensor information collected by a sensor circuit (e.g., WiFi, BLE, UWB, GPS, accelerometer (ACC), gyro sensors, or any other sensor device known to one of ordinary skill in the art). In one or more examples, the location information of the electronic device 301 and the information about a device around the electronic device 301 may be calculated by the ambient situation recognition module 660 (e.g., the user vicinity device search module 663) using the sensor information.

According to an embodiment, the phase determination module 620 may operate the first and the second wireless audio devices 302-1 and 302-2 to enter one of a first mode change phase and a second mode change phase based on the information related to the electronic device 301 and whether media is played on the electronic device 301. The first mode change phase may be for determining to change the operation mode of the first and the second wireless audio devices 302-1 and 302-2 to one of the singing mode and the dialogue mode. The second mode change phase may be for determining to change the operation mode of the first and the second wireless audio devices 302-1 and 302-2 to the dialogue mode.

For example, when the number of peripherals of the electronic device 301 is less than a predetermined number, when a low-noise environment is detected based on an audio signal, or when the user's pre-registration location for the singing mode is detected, the first and the second wireless audio devices 302-1 and 302-2 may enter the first mode change phase.

According to an embodiment, the phase determination module 620 may learn the usage pattern of the user by using the user's usage pattern model. The phase determination module 620 may enter the first mode change phase according to the usage pattern of the user's singing mode. For example, the phase determination module 620 may enter the first mode change phase when the phase determination module 620 determines that the user is located in an environment that is substantially identical to or similar to an environment in which the user frequently sings based on the user's usage pattern. The user's usage pattern may be designated as one or more of information related to the electronic device 301 and whether the electronic device 301 plays media. The information related to the electronic device 301 may include environment information (e.g., the type and size of ambient noise), location information, and the type and number of peripheral devices.

According to an embodiment, the dialogue mode module 625 may detect a dialogue between the user of the wireless audio device 302 and a person other than the user in the first mode change phase and the second mode change phase and may thus determine to activate or deactivate the dialogue mode.

According to an embodiment, in the first mode change phase, when the singing mode is not initiated by the singing mode module 627 and a voice signal corresponding to the user's utterance is maintained for a designated time period (e.g., L frames or more, wherein L is a positive integer), the dialogue mode module 625 may determine to activate the dialogue mode. In one or more examples, in the first mode change phase, when the singing mode is not initiated by the singing mode module 627 and a voice signal corresponding to the other person's utterance is maintained for a designated time period after the user's utterance is deactivated, the dialogue mode module 625 may determine to activate the dialogue mode.

According to an embodiment, in the second mode change phase, when a voice signal corresponding to the user's utterance is maintained for a designated time period (e.g., L frames or more, wherein L is a positive integer), the dialogue mode module 625 may determine to activate the dialogue mode. In one or more examples, in the second mode change phase, the dialogue mode module 625 may determine to activate the dialogue mode when a voice signal corresponding to the other person's utterance is maintained for a designated time period after the user's utterance is deactivated.

According to an embodiment, the dialogue mode module 625 may be configured to interact with the voice agent module 630. For example, the dialogue mode module 625 may obtain, from the voice agent module 630, information instructing that the dialogue mode be activated. For example, the singing mode module 627 may determine to activate the singing mode based on the instruction of the voice agent module 630 instead of one or more activation conditions of the singing mode.

According to an embodiment, the singing mode module 627 may detect the user's singing voice in the first mode change phase and thus, determine to activate or deactivate the singing mode. The singing mode module 627 may have priority over the dialogue mode module 625 in determining to activate or deactivate the singing mode in the first mode change phase.

According to an embodiment, the singing mode module 627 may determine to activate or deactivate the singing mode in the first mode change phase based on whether the analysis result of an audio signal received through the phase determination module 620 and a pre-processed audio signal satisfies the one of more activation conditions of the singing mode. The one of more activation conditions of the singing mode may refer to the user of the electronic device 301 to be classified according to the sensitivity level of the electronic device 301 among a first sensitivity level, a second sensitivity level, and a third sensitivity level.

According to an embodiment, the one of more activation conditions according to the first sensitivity level may include conditions about whether a singing voice in ambient sounds is continuously detected for a predetermined time. The one of more activation conditions according to the second sensitivity level may include conditions about acoustic similarity between media and a singing voice included in ambient sounds. The ambient sounds and media may be included in the audio signal. The one of more activation conditions according to the third sensitivity level may include conditions about similarity between lyrics included in a singing voice included in ambient sounds and lyrics included in media.

According to an embodiment, the singing mode module 627 may determine whether the one of more activation conditions are satisfied according to a sensitivity level (e.g., the first sensitivity level, the second sensitivity, or the third sensitivity level) based on the similarity between media and a singing voice and whether the singing voice received from the similarity determination module 670 has been detected. The singing mode module 627 may determine to activate the singing mode when the one of more activation conditions are satisfied.

According to an embodiment, the one of more activation conditions of the singing mode may include activation conditions according to all levels below the sensitivity level of the electronic device 301. For example, when the sensitivity level of the electronic device 301 is the second sensitivity level, the one of more activation conditions of the singing mode may include the one of more activation conditions according to the first sensitivity level and the second sensitivity level. When the sensitivity level of the electronic device 301 is the third sensitivity level, the one of more activation conditions of the singing mode may include the one of more activation conditions according to the first sensitivity level, the second sensitivity level, and the third sensitivity level.

According to an embodiment, the singing mode module 627 may be configured to interact with the voice agent module 630. For example, the singing mode module 627 may obtain, from the voice agent module 630, information instructing that the singing mode be activated. That is, in this case, the singing mode module 627 may determine to activate the singing mode based on the instruction of the voice agent module 630, not the one of more activation conditions of the singing mode.

According to an embodiment, the singing mode module 627 may determine to deactivate the singing mode in the singing mode. For example, the singing mode module 627 may determine to deactivate the singing mode when the analysis result of the audio signal received by the first and second wireless audio devices 302-1 and 302-2 in the singing mode no longer satisfies the one of more activation conditions of the singing mode. In one or more examples, the singing mode module 627 may determine to deactivate the singing mode based on information related to the electronic device 301 and whether the media have been played. In this case, the singing mode module 627 may determine to deactivate the singing mode by determining that the singing mode is no longer necessary according to the media no longer being played on the electronic device 301 and the information related to the electronic device 301.

According to an embodiment, the voice agent module 630 may transmit, to the dialogue mode module 625 or the singing mode module 627, a signal instructing that the dialogue mode or the singing mode be activated. Accordingly, the dialogue mode module 625 or the singing mode module 627 may determine to activate the dialogue mode or the singing mode.

According to an embodiment, the sound control module 640 may control the output signal of the wireless audio device 302 by the dialogue mode control module 655 or the singing mode control module 657 according to the dialogue mode or the singing mode. The sound control module 640 may transmit an output signal to an audio output circuit 571 such that the output signal is output (e.g., played) through the audio output circuit 571.

According to an embodiment, the dialogue mode control module 655 may control the output signal of the wireless audio device 302 using the sound control module 640. The dialogue mode control module 655 may output at least one or more ambient sounds included in the audio signal in the dialogue mode. For example, in the dialogue mode, the dialogue mode control module 655 may change the volume of at least one or more ambient sounds to a first gain and output the changed volume of the first gain.

According to an embodiment, the singing mode control module 657 may control the output signal of the wireless audio device 302 using the sound control module 640. The singing mode control module 657 may output at least one or more ambient sounds and media included in an audio signal in the singing mode. For example, the singing mode control module 657 may change the volume of at least one or more ambient sounds to a second gain in the singing mode and output the changed volume of the second gain.

According to an embodiment, the similarity determination module 670 may detect information about a singing voice in ambient sounds included in an audio signal based on characteristics of the singing voice. The similarity determination module 670 may extract a main part of a signal for ambient sounds included in an audio signal and a main part of a signal for a reference signal corresponding to media included in the audio signal. Based on the main part of signals and the singing voice, acoustic similarity between the media and the singing voice and the lyrics similarity therebetween may be calculated. The similarity determination module 670 may output similarity to the singing mode module 627 and when the similarity exceeds a predetermined threshold, may determine to activate the singing mode.

Figure 8:
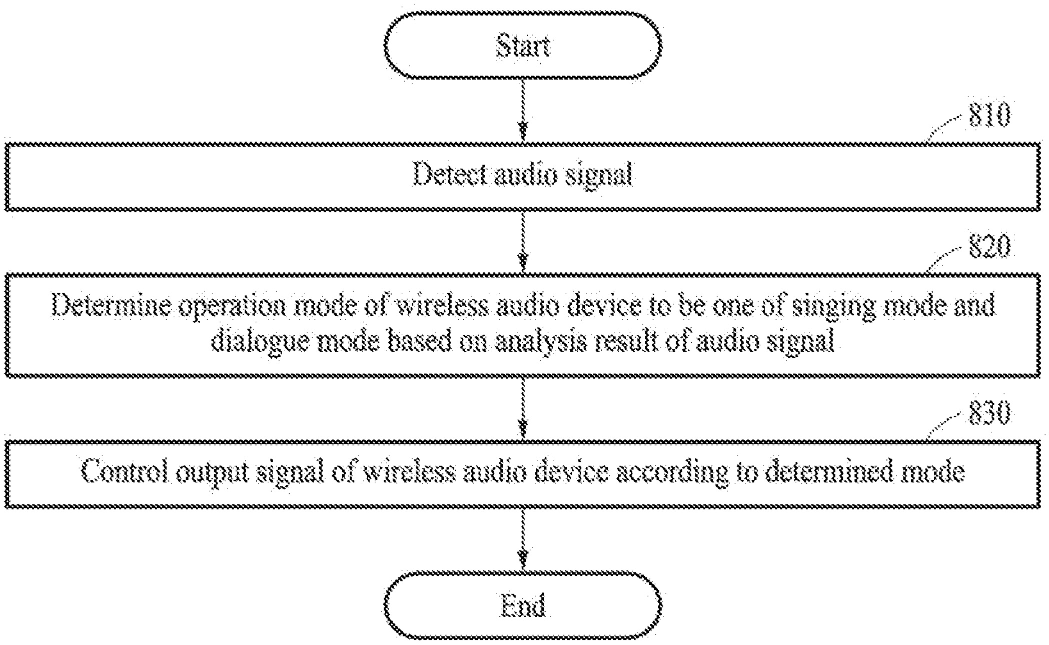
FIG. 8 is a flowchart illustrating an operation of controlling an output signal by a wireless audio device, according to an embodiment.

FIG. 8 is a flowchart illustrating an operation of controlling an output signal by a wireless audio device, according to an embodiment.

In the following embodiments, one or more operations may be performed sequentially. However, as understood by one of ordinary skill in the art, one or more operation may be performed in parallel. For example, the order of the operations may change, and at least two of the operations may be performed in parallel.

According to an embodiment, operations 810 to 830 may be performed by a processor (e.g., the processors 521 and 522) of a wireless audio device (e.g., the wireless audio device 302 of FIG. 3).

Operations 810 to 830 may be operations in which a wireless audio device according to an embodiment controls an output signal according to one of a singing mode and a dialogue mode.

In operation 810, a wireless audio device (e.g., the wireless audio device 302 of FIG. 3) may detect an audio signal. The audio signal may include one or more ambient sounds. The audio signal may include a reference signal corresponding to media played on the electronic device 301.

In operation 820, the wireless audio device 302 may determine the operation mode of the wireless audio device 302 as one of the singing mode and the dialogue mode based on an analysis result of the audio signal. The dialogue mode may be a mode for outputting at least one or more ambient sounds and the singing mode may be a mode for outputting at least one or more ambient sounds and media.

In operation 830, the wireless audio device 302 may control the output signal of the wireless audio device 302 according to the determined mode. The wireless audio device 302 may change the volume of some of the ambient sounds to a first gain in the dialogue mode and output the changed volume of the first gain and may change the volume of at least one or more ambient sounds to a second gain in the singing mode and output the changed volume of the second gain.

Figure 9:
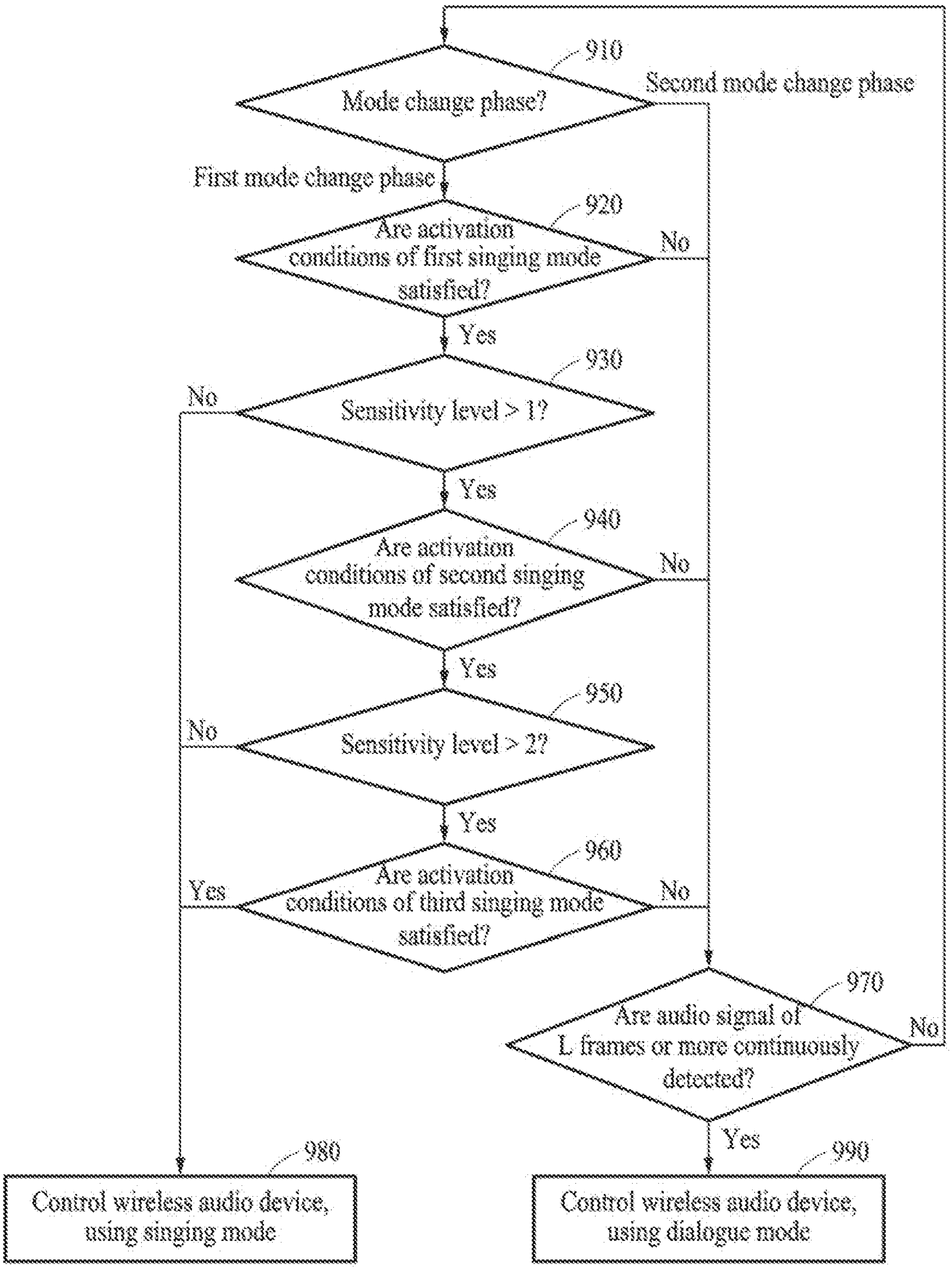
FIG. 9 is a flowchart illustrating an operation in which a wireless audio device according to an embodiment controls an output signal according to one of a singing mode and a dialogue mode.

FIG. 9 is a flowchart illustrating an operation in which a wireless audio device according to an embodiment controls an output signal according to one of a singing mode and a dialogue mode.

In the following embodiments, one or more operations may be performed sequentially. However, as understood by one of ordinary skill in the art, one or more operation may be performed in parallel. For example, the order of the operations may change, and at least two of the operations may be performed in parallel.

According to an embodiment, operations 910 to 990 may be performed by a processor (e.g., the processors 521 and 522 of FIG. 4) of a wireless audio device (e.g., the wireless audio device 302 of FIG. 3).

Operations 910 to 990 may be operations in which the wireless audio device 302 according to an embodiment controls an output signal according to one of a singing mode and a dialogue mode in a state in which use of both the dialogue mode and the singing mode is set to be on (e.g., both the dialogue mode and the singing mode are enabled).

In an embodiment, when the wireless audio device 302 determines that media has no lyrics based on media information received from the electronic device 301, the wireless audio device 302 may limit a sensitivity level to only one of a first sensitivity level and a second sensitivity level.

In operation 910, the wireless audio device (e.g., the wireless audio device 302 of FIG. 3) may determine to enter one of a first mode change phase and a second mode change phase. The wireless audio device 302 may determine to enter one of the first mode change phase and the second mode change phase based on information related to the electronic device 301 and whether media is played on the electronic device 301. The information related to the electronic device 301 may include one or more of environment information of the electronic device 301, location information of the electronic device 301, and information about a device around the electronic device 301.

For example, the wireless audio device 302 may determine to enter the first mode change phase when media is being played, when the location of the user of the wireless audio device 302 is confirmed to be a where the user frequently sings according to a predetermined number of activations of the singing mode at a current location, when the number of devices around the electronic device 301 is less than a predetermined number, when a low noise environment is detected based on an audio signal, or when the user's pre-registered location for the singing mode is detected.

The wireless audio device 302 may perform operation 920 when the wireless audio device 302 determines to enter the first mode change phase and may perform operation 960 when the wireless audio device 302 determines to enter the second mode change phase. The first mode change phase may be for determining to change the operation mode of the wireless audio device 302 to one of the singing mode and the dialogue mode. The second mode change phase may be for determining to change the operation mode of the wireless audio device 302 to the dialogue mode.

In operation 920, the wireless audio device 302 may determine whether one or more activation conditions according to the first sensitivity level (e.g., first singing mode activation conditions) are satisfied based on an audio signal detected by the wireless audio device 302 and a pre-processed audio signal. The first singing mode activation conditions may include one or more conditions about whether a singing voice in one or more ambient sounds included in an audio signal is continuously detected for a predetermined time.

For example, the wireless audio device 302 may determine that second singing mode activation conditions are satisfied when a singing voice is maintained for a designated time period (e.g., N frames or more and N is a positive integer) in one or more ambient sounds included in the audio signal. The singing voice may include one or more of a voice singing along and a humming voice.

The wireless audio device 302 may perform operation 930 when the first singing mode activation conditions are satisfied and may perform operation 970 when the first singing mode activation conditions are not satisfied.

In operation 930, the wireless audio device 302 may determine whether the sensitivity level of the electronic device 301 is greater than 1. The sensitivity level of the electronic device 301 may be a sensitivity level previously set by the user or may be a default sensitivity level (e.g., the first sensitivity level) when the sensitivity level is not previously set by the user. The wireless audio device 302 may perform operation 940 when the sensitivity level of the electronic device 301 is greater than 1 and may perform operation 980 when the sensitivity level of the electronic device 301 is 1 or less.

In operation 940, the wireless audio device 302 may determine whether one or more activation conditions according to the second sensitivity level (e.g., second singing mode activation conditions) are satisfied based on an audio signal detected by the wireless audio device 302 and a pre-processed audio signal. The second singing mode activation conditions may include one or more conditions about acoustic similarity between a singing voice included in ambient sounds and media. The ambient sounds and media may be included in an audio signal.

For example, the wireless audio device 302 may compare a singing voice in ambient sounds included in an audio signal to a reference signal corresponding to media played in the electronic device 301. The wireless audio device 302 may determine that the second singing mode activation conditions are satisfied when the acoustic similarity between the singing voice and the reference signal exceeds a predetermined threshold according to a result of the comparison or when pattern matching similarity between the singing voice and the reference signal exceeds a predetermined threshold.

The wireless audio device 302 may perform operation 950 when the second singing mode activation conditions are satisfied and may perform operation 970 when the second singing mode activation conditions are not satisfied.

In operation 950, the wireless audio device 302 may determine whether the sensitivity level of the electronic device 301 is greater than 2. The wireless audio device 302 may perform operation 960 when the sensitivity level of the electronic device 301 is greater than 2 and may perform operation 980 when the sensitivity level of the electronic device 301 is 2 or less.

In operation 960, the wireless audio device 302 may determine whether one or more activation conditions according to a third sensitivity level (e.g., third singing mode activation conditions) are satisfied based on an audio signal detected by the wireless audio device 302 and a pre-processed audio signal. The third singing mode activation conditions may include conditions about similarity between lyrics included in a singing voice included in ambient sounds and lyrics included in media.

For example, the wireless audio device 302 may compare a singing voice in ambient sounds included in an audio signal to a reference signal corresponding to media played on the electronic device 301. The wireless audio device 302 may determine that the third singing mode activation conditions are satisfied when the lyrics similarity (e.g., the similarity of the length of the lyrics or the similarity of the content of the lyrics) between the singing voice and the reference signal exceeds a predetermined threshold according to a result of the comparison.

The wireless audio device 302 may perform operation 980 when the third singing mode activation conditions are satisfied and may perform operation 970 when the third singing mode activation conditions are not satisfied.

In operation 970, the wireless audio device 302 may determine whether a voice signal corresponding to an utterance of a user (or a person other than the user) included in an audio signal is detected during a designated time period (e.g., L frames or more, wherein L is a positive integer). The wireless audio device 302 may perform operation 990 when a voice signal is detected for a designated time period or more and may perform operation 910 when a voice signal is not detected for a designated time period or more.

In operation 980, the wireless audio device 302 may control the output signal of the wireless audio device 302 according to the singing mode. The wireless audio device 302 may change the volume of at least one or more ambient sounds to a second gain in the singing mode and output the changed volume of the second gain. For example, the wireless audio device 302 may change the volume of a singing voice in ambient sounds to the second gain in the singing mode and change the volume of a reference signal corresponding to media by corresponding to the second gain. When the wireless audio device 302 outputs (e.g., reproduces) the reference signal corresponding to the media along with the singing voice of the second gain, the volume of the reference signal corresponding to the media may be changed to such a degree of a gain that the user may monitor the two signals.

In the singing mode, the wireless audio device 302 may deactivate the singing mode when activation conditions (e.g., the first singing mode activation conditions, the second singing mode activation conditions, or the third singing mode activation conditions) according to the sensitivity level of the wireless audio device 302 are not satisfied. In one or more examples, the wireless audio device 302 may deactivate the singing mode when the wireless audio device 302 determines the mode change phase to enter the second mode change phase based on one or more of information related to the electronic device 301 and whether the wireless audio device 302 plays media on the electronic device 301. When the singing mode is deactivated, the wireless audio device 302 may restore gain settings for ambient sounds and a reference signal before the singing mode is activated.

In operation 990, the wireless audio device 302 may control the output signal of the wireless audio device 302 according to the dialogue mode. The wireless audio device 302 may change the volume of at least one or more ambient sounds to a first gain and output the changed volume of the first gain in the dialogue mode. For example, the wireless audio device 302 may deactivate ANC in the dialogue mode and change the volume of the ambient sounds to the first gain. In one or more examples, when media is being played on the wireless audio device 302 in the dialogue mode, the wireless audio device 302 may reduce the volume of a reference signal corresponding to the media by as much as a predetermined ratio or more or set the volume up to mute. The user of the wireless audio device 302 may more clearly hear a dialogue included in ambient sounds in the dialogue mode.

Figure 10:
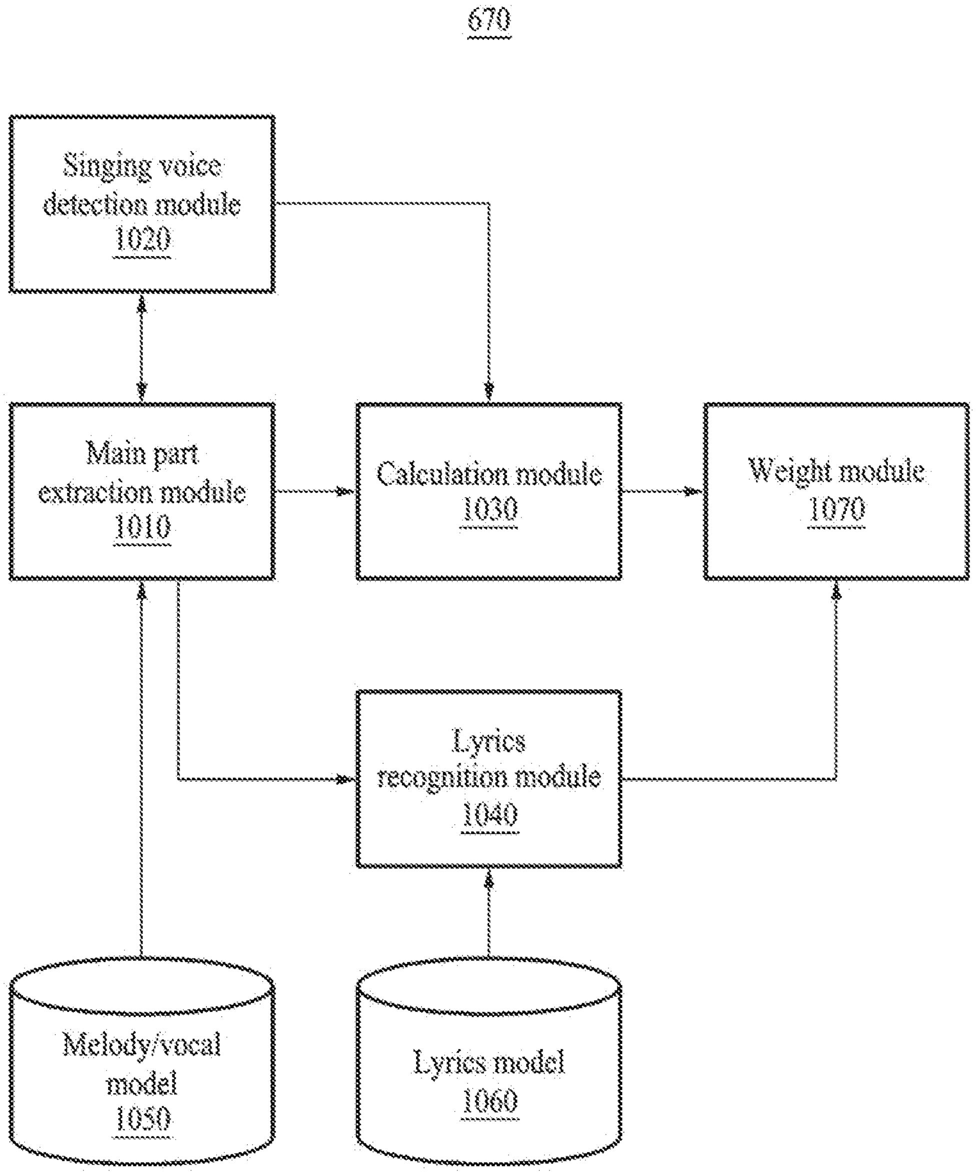
FIG. 10 is a schematic diagram of a similarity determination module according to an embodiment.

FIG. 10 is a schematic diagram of a similarity determination module according to an embodiment.

Referring to FIG. 10, according to an embodiment, a similarity determination module 670 may include a main part extraction module 1010, a singing voice detection module 1020, a calculation module 1030, a lyrics recognition module 1040, a melody/vocal model 1050, a lyrics model 1060, and a weight model 1070.

According to an embodiment, the singing voice detection module 1020 may receive an audio signal from an audio reception circuit (e.g., the audio reception circuits 581, 582, and 583 of FIG. 7) and may receive a pre-processed audio signal from a pre-processing module (e.g., the pre-processing module 610 of FIG. 7). The singing voice detection module 1020 may detect information about a singing voice in ambient sounds included in an audio signal based on characteristics of the singing voice. For example, the singing voice, not similar to a normal voice, may have characteristics of a long fixed pitch duration and a short pause period. A pitch may refer to the height of a sound and a pause may refer to a section in which a voice is not played. The singing voice detection module 1020 may detect information about the singing voice through signal processing-based pitch/melody estimation or learning-based various deep learning classifiers based on characteristics of the singing voice. The information about the singing voice may include information about whether a specific section (e.g., a frame) of ambient sounds or a reference signal is a singing voice, information of a detected signal (e.g., acoustic information), and probability information about the degree where a specific section of the ambient sounds or reference signal approaches the singing voice.

According to an embodiment, the singing voice detection module 1020 may further utilize main part information of ambient sounds to detect a singing voice. The main part information of the ambient sounds may be related to a main melody or a vocal received from the main part extraction module 1010.

According to an embodiment, the singing voice detection module 1020 may be activated in the case of determining activation conditions of the singing mode according to a sensitivity level equal to or greater than the first sensitivity level. A wireless audio device (e.g., the wireless audio device 302 of FIG. 3) may use the singing voice detection module 1020 to determine whether the one of more activation conditions of the singing mode according to the first sensitivity level are satisfied.

According to an embodiment, the main part extraction module 1010 may receive an audio signal from an audio reception circuit (e.g., the audio reception circuits 581, 582, and 583 of FIG. 7) and receive a pre-processed audio signal from a pre-processing module (e.g., the pre-processing module 610 of FIG. 7). The main part extraction module 1010 may extract a main part of a signal for ambient sounds included in an audio signal and a main part of a signal for a reference signal corresponding to media included in the audio signal. The main part extraction module 1010 may extract either a main melody or a vocal as a main part of a signal based on media information. The media information may be about whether lyrics are included in the media. The media information may be obtained from an electronic device (e.g., the electronic device 301 of FIG. 3).

According to an embodiment, the main part extraction module 1010 may extract the main part of a signal for the ambient sounds and the main part of a signal for the reference signal by using the melody/vocal model 1050. The main part extraction module 1010 may extract a main part of a signal using a melody model in melody/vocal models 1050 when the media does not include lyrics according to the media information. The main part extraction module 1010 may extract a main part of a signal using a vocal model in the melody/vocal models 1050 when the media includes lyrics according to the media information.

According to an embodiment, the melody model in the melody/vocal models 1050 may have an input as media without lyrics (e.g., an instrumental song) or characteristics of the media and may be trained to produce the main melody of the media as a target output. In the melody/vocal models 1050, the vocal model may have an input as media having lyrics or characteristics of the media and may be trained to produce the main vocal of the media as a target output.

According to an embodiment, the calculation module 1030 may calculate acoustic similarity between media and a singing voice based on the main part of signals and the singing voice. The main part of a signal may include the main part of a signal of a reference signal and the main part of a signal of a singing voice. For a singing voice, which is detected in ambient sounds obtained from a voice pickup unit (VPU), the calculation module 1030 may apply bandwidth extension to the singing voice to compensate for the low frequency resolution of a VPU signal and then acoustically calculate similarity or may calculate acoustic similarity only for the singing voice corresponding to VPU signal bandwidth.

According to an embodiment, the calculation module 1030 may calculate the acoustic similarity based on melody characteristics (e.g., an octave, a pitch, duration, or any other suitable melody characteristics) or vocal characteristics (e.g., a pitch, prosody, or any other suitable vocal characteristic). The calculation module 1030 may calculate acoustic similarity by reflecting variations in characteristics of a melody and characteristics of a vocal, considering the case of the user not singing accurately. For example, the calculation module 1030 may calculate the acoustic similarity by reflecting the dynamic margin of the characteristics of the melody and the characteristics of the vocal. The dynamic margin may refer to a range where variations of characteristics of the melody and characteristics of the vocal may generate.

According to an embodiment, the calculation module 1030 may calculate similarity between main part of signals by performing pattern matching between the main part of signals extracted through a hidden markov model (HMM), deep learning, a template, or any other suitable learning model known to one of ordinary skill in the art. In addition, the calculation module 1030 may obtain a text pattern by performing first conversion of a melody or a vocal in a main part of a signal into an octave (e.g., CDCCDEF) and then second conversion into a text pattern. The calculation module 1030 may calculate similarity by comparing text patterns.

According to an embodiment, in the case of the similarity determination module 670 outputting similarity to the singing mode control module 657 when a singing mode module (e.g., the singing mode module 627 of FIGS. 6 and 7) exceeds a predetermined threshold, the similarity determination module 670 may determine to activate the singing mode. The one of more activation conditions of the singing mode may correspond to activation conditions according to the second sensitivity level. The degree of similarity may be calculated as a score between 0 and 1, with 1 being a perfect match and 0 being a mismatch.

According to an embodiment, the calculation module 1030 and the weight module 1070 may be activated in the case of determining activation conditions according to a sensitivity level equal to or greater than the second sensitivity level. A wireless audio device (e.g., the wireless audio device 302 of FIG. 3) may use the calculation module 1030 to determine whether activation conditions according to the second sensitivity level are satisfied.

According to an embodiment, the lyrics recognition module 1040 may recognize lyrics included in main part of signals by using a lyrics model (e.g., an ASR-for-lyrics model). For example, the lyrics recognition module 1040 may calculate the similarity in the length of lyrics and the similarity in the content of lyrics between main part of signals through a method, such as a word error rate (WER).

The lyrics recognition module 1040 may calculate similarity based on the similarity of the length of the lyrics and the similarity of the content of the lyrics, so that the lyrics recognition module 1040 may recognize that the user is singing even when the user sings a part of the lyrics with a different word or omits a part of the lyrics. The lyrics recognition module 1040 may output a WER value or a value obtained by normalizing similarity with respect to the length of lyrics to between 0 and 1.

According to an embodiment, when each syllable of a specific word in lyrics is uttered for a long time (e.g., "your memorrrrry"), a syllable may be frequently inserted. In such a case, the lyrics recognition module 1040 may change a main part of a signal to a form where a repeated syllable is removed (e.g., "your memory") and then calculate similarity in the length of the lyrics between the main signals and the similarity in the content of the lyrics.

According to an embodiment, the weight module 1070 may receive acoustic similarity between the media and the singing voice from the calculation module 1030. The acoustic similarity may include similarity between a reference signal and a singing voice detected in ambient sounds obtained from a VPU and similarity between a reference signal and a singing voice detected in ambient sounds obtained from a microphone. The weight module 1070 may adjust a final similarity value by assigning weight between the similarity values. For example, when it is determined that there is a loud noise in the surrounding environment so ambient sounds obtained from a microphone is noisy, the weight module 1070 may apply a relatively greater weight to the similarity between the reference signal and the singing voice detected in the ambient sounds obtained from the VPU than the similarity between the reference signal and the singing voice detected in the ambient sounds obtained by the microphone.

According to an embodiment, the weight module 1070 may receive lyrics similarity between main part of signals from the lyrics recognition module 1040. The weight module 1070 may calculate final similarity by assigning one or more weights to the detection section length of a singing voice, similarity between main part of signals, a lyric recognition rate, the recognition length of a main part of a signal, or any other sound component known to one of ordinary skill in the art. The weight module 1070 may transmit the final similarity to the singing mode module 627. The singing mode module 627 may use the final similarity to determine whether the one of more activation conditions according to the second sensitivity level and the one of more activation conditions according to the third sensitivity level are satisfied.

According to an embodiment, the lyrics recognition module 1040 may be activated when the lyrics recognition module 1040 determines activation conditions according to the third sensitivity level. The wireless audio device (e.g., the wireless audio device 302 of FIG. 3) may use the lyrics recognition module 1040 to determine whether activation conditions according to the third sensitivity level are satisfied.

Figure 11:
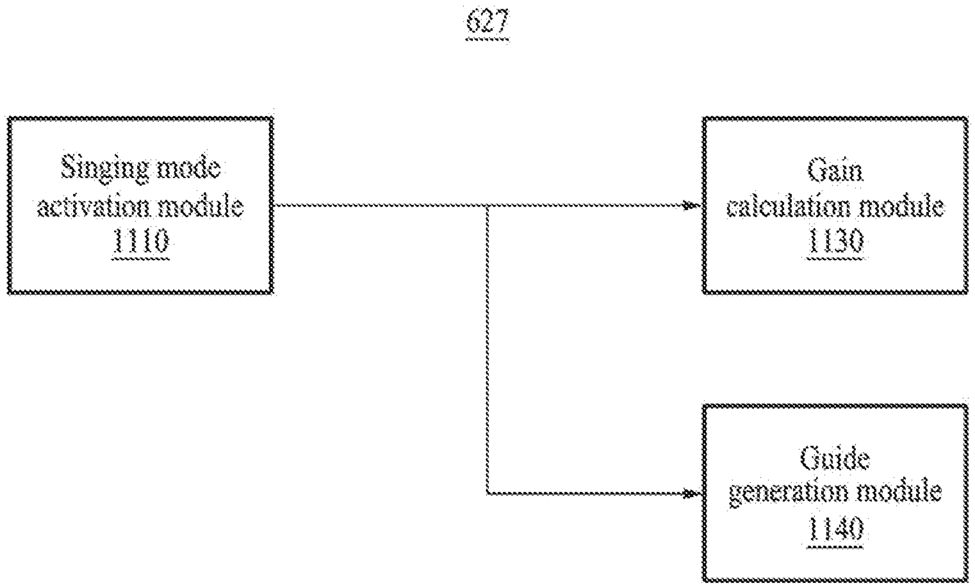
FIG. 11 is a schematic diagram of a singing mode module according to an embodiment.

FIG. 11 is a schematic diagram of a singing mode module 627 according to an embodiment.

Referring to FIG. 11, according to an embodiment, the singing mode module 627 may include a singing mode activation module 1110, a gain calculation module 1130, and a guide generation module 1140. The singing mode module 627 may determine to activate a singing mode based on components and calculate a gain for performing control of an output signal in the singing mode. The singing mode module 627 may generate a guide for optimizing the user's music listening experience in the singing mode.

According to an embodiment, the singing mode activation module 1110 may determine whether activation conditions of the singing mode according to the sensitivity level of an electronic device 301 are satisfied. When the gain calculation module 1130 determines that the singing mode activation module 1110 satisfies the one of more activation conditions of the singing mode, the gain calculation module 1130 may compare the intensity of a singing voice to the intensity of external noise included in an audio signal detected by a wireless audio device (e.g., the wireless audio device 302 of FIG. 3). The gain calculation module 1130 may calculate the appropriate volume of the singing voice and media included in the audio signal based on a comparison result. For example, the appropriate volume of the media may be a minimum volume within a range where the user may hear the media. The appropriate volume of the singing voice may be a volume that allows the user to also monitor the media. The gain calculation module 1130 may reflect the volume for the singing mode previously set by the user. The gain calculation module 1130 may transmit appropriate volumes each for the media and the singing voice to a singing mode control module (e.g., the singing mode control module 657 of FIGS. 6 and 7).

According to an embodiment, the guide generation module 1140 may generate a guide that may optimize the user's music listening experience in the singing mode and provide the generated guide to the user. For example, the guide generation module 1140 may provide guide information about media to the user when the user selects to provide a song guide or when the similarity between the singing voice and the media is low. The guide information about the media may include main melody information that may enable the user to sing along with media (e.g., a song), a beat, or lyrics to be played in the next measure of a song. The guide information about the media may be output through the wireless audio device 302 through TTS generation in low sound audio or may be displayed as visual information on the screen of the electronic device 301.

According to an embodiment, operations (e.g., activation/deactivation of the singing mode and provision of a guide) of the singing mode module 627 may be performed by the voice agent module 630.

According to an embodiment, when a plurality of wireless audio devices 302 connects to the electronic device 301 or when the plurality of wireless audio devices 302 shares music being played with each other through music sharing or any other mechanism for sharing music known to one of ordinary skill in the art, the singing mode may also be activated. In this case, users of the plurality of wireless audio devices 302 may simultaneously monitor singing voices with each other while listening to a song.

Figure 12A:
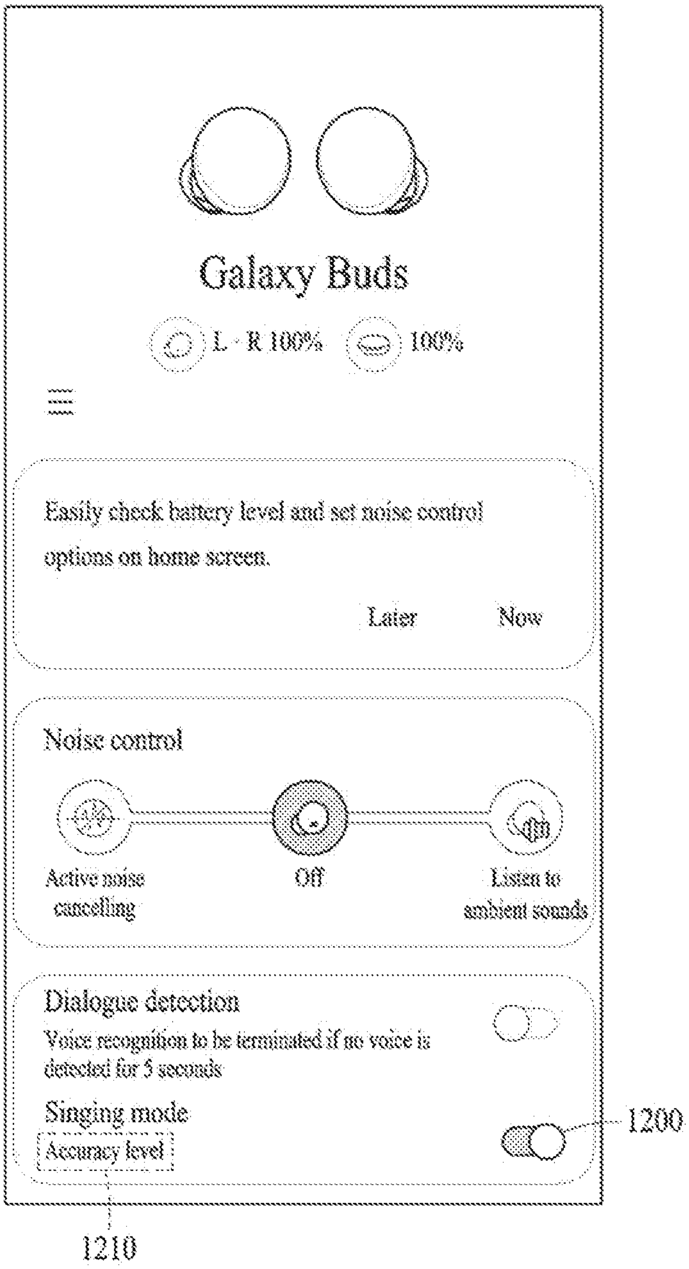
FIGS. 12A and 12B are examples of screens output on a display of an electronic device according to an embodiment.
Figure 12B:
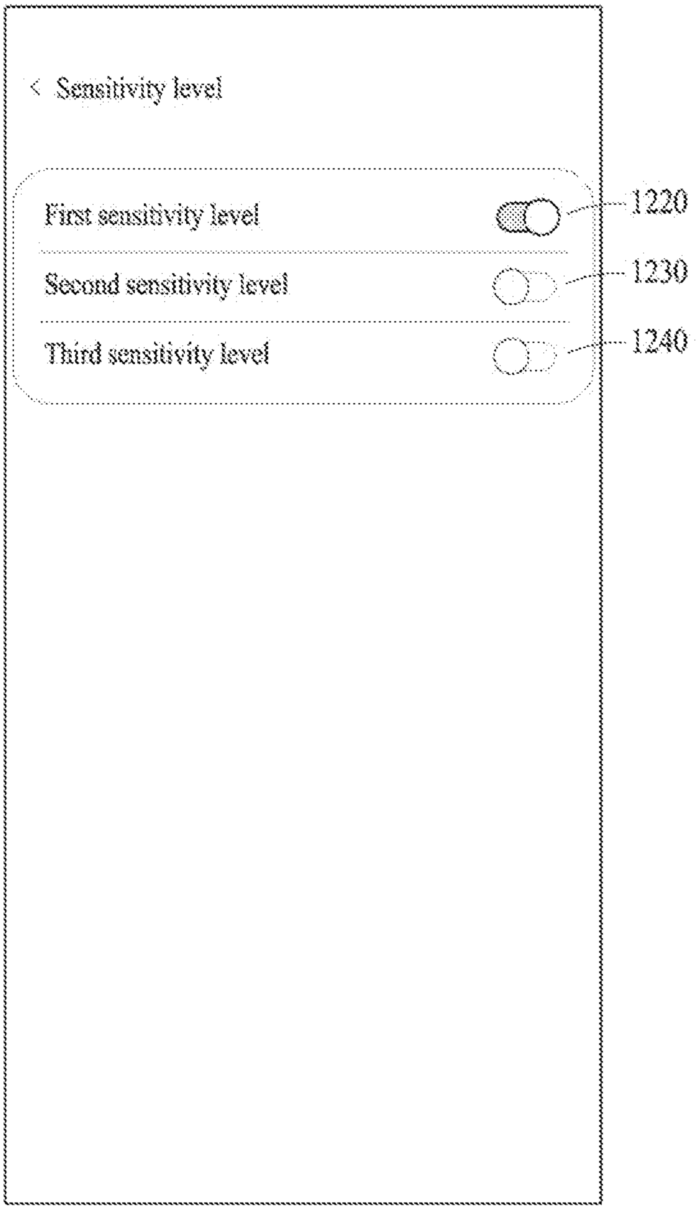

FIGS. 12A and 12B are examples of screens output on a display of an electronic device according to an embodiment.

Referring to FIGS. 12A and 12B, according to an embodiment, an electronic device 301 may display, on the execution screen of the electronic device 301, a user interface for setting a singing mode of a wireless audio device (e.g., the wireless audio device 302 of FIG. 3). For example, a user may enter the mode determination phase described above with reference to FIG. 9 by turning on a setting 1200 of the singing mode on the interface. In addition, the user interface may include a setting 1210 for an accuracy level that is activated when the singing mode is on. The interface may include settings for a plurality of sensitivity levels as detailed items of the setting 1210 for an accuracy level. For example, settings for the plurality of sensitivity levels may include settings for a first sensitivity level 1220, a second sensitivity level 1230, and a third sensitivity level 1240.

According to an embodiment, when the user does not change the settings for the sensitivity level, the sensitivity level may be configured to the first sensitivity level by default.

A wireless audio device 102, 202, or 302 may include a memory 141, 531, or 532 including instructions and a processor 131, 521, or 522 electrically connected to the memory 141, 531, or 532 and configured to execute the instructions. When the instructions are executed by the processor 131, 521, or 522, the processor 131, 521, or 522 may be configured to perform a plurality of operations. The plurality of operations may include detecting an audio signal. The plurality of operations may include determining an operation mode of the wireless audio device 102, 202, or 302 to be one of a singing mode and a dialogue mode based on an analysis result of the audio signal. The plurality of operations may include controlling an output signal of the wireless audio device 102, 202, or 302 according to the determined operation mode. The dialogue mode may be a mode for outputting at least one or more ambient sounds included in the audio signal, and the singing mode may be a mode for outputting one or more media sounds and the one or more ambient sounds included in the audio signal.

The determining may include entering one of a first mode change phase, which is for determining to change to one of the singing mode and the dialogue mode, and a second mode change phase, which is for determining to change to the dialogue mode, based on one or more of information related to the electronic device 101, 201, or 301 and whether media is played on the electronic device 101, 201, or 301 connecting to the wireless audio device 102, 202, or 302.

The information related to the electronic device 101, 201, or 301 may include one or more of environment information of the electronic device 101, 201, or 301, location information of the electronic device 101, 201, or 301, and information about a device around the electronic device 101, 201, or 301.

The determining may include, in the first mode change phase, determining the operation mode to be the one of the singing mode and the dialogue mode based on whether the analysis result satisfies activation conditions of the singing mode.

The one of more activation conditions of the singing mode may be classified according to a sensitivity level of the electronic device 101, 201, or 301 among a first sensitivity level, a second sensitivity level, and a third sensitivity level.

The one or more activation conditions according to the first sensitivity level may include conditions about whether a singing voice in the ambient sounds is continuously detected for a designated period time.

The one or more activation conditions according to the second sensitivity level may include conditions about acoustic similarity between the singing voice included in the ambient sounds and the media.

The one or more activation conditions according to the third sensitivity level may include conditions about similarity between lyrics included in the singing voice included in the ambient sounds and lyrics included in the media.

The controlling may include, in the dialogue mode, changing a volume of the one or more ambient sounds to a first gain and outputting the changed volume of the first gain and, in the singing mode, changing a volume of the one or more ambient sounds to a second gain and outputting the changed volume of the second gain.

The one of more activation conditions of the singing mode may include activation conditions according to all levels below the sensitivity level of the electronic device 101, 201, or 301.

In the singing mode, when the one of more activation conditions of the singing mode are not satisfied, the plurality of operations may further included activating the singing mode.

The plurality of operations may further include tracking the singing voice included in the ambient sounds in the singing mode to provide information about the singing voice.

A wireless audio device 102, 202, or 302 may include a memory 141, 531, or 532 including instructions and a processor 131, 521, or 522 electrically connected to the memory 141, 531, or 532 and configured to execute the instructions. When the instructions are executed by the processor 131, 521, or 522, the processor 131, 521, or 522 may be configured to perform a plurality of operations. The plurality of operations may include detecting an audio signal. The plurality of operations may further include determining an operation mode of the wireless audio device 102, 202, or 302 for the audio signal to be a singing mode. The plurality of operations may further include controlling an output signal of the wireless audio device 102, 202, or 302 according to the singing mode. The singing mode may be a mode for outputting some of one or more media sounds and one or more ambient sounds included in the audio signal.

A wireless audio device 102, 202, or 302 may include a memory 141, 531, or 532 including instructions and a processor 131, 521, or 522 electrically connected to the memory 141, 531, or 532 and configured to execute the instructions. When the instructions are executed by the processor 131, 521, or 522, the processor 131, 521, or 522 may be configured to perform a plurality of operations. The plurality of operations may include detecting an audio signal. The plurality of operations may include determining an operation mode of the wireless audio device 102, 202, or 302 for the audio signal to be one of a singing mode and a dialogue mode based on an analysis result of the audio signal. When the determined operation mode is the dialogue mode, the plurality of operations may include outputting one or more ambient sounds included in the audio signal. When the determined operation mode is the singing mode, the plurality of operations may include outputting one or more media sounds and the one or more ambient sounds included in the audio signal. In the singing mode, when a singing voice is not detected in the ambient sounds for a predetermined period time or more, the plurality of operations may include deactivating the singing mode.

The determining may include entering one of a first mode change phase, which is for determining to change to one of the singing mode and the dialogue mode, and a second mode change phase, which is for determining to change to the dialogue mode, based on one or more of information related to the electronic device 101, 201, or 301 and whether media is played on the electronic device 101, 201, or 301 connecting to the wireless audio device 102, 202, or 302.

The information related to the electronic device 101, 201, or 301 may include one or more of environment information of the electronic device 101, 201, or 301, location information of the electronic device 101, 201, or 301, and information about a device around the electronic device 101, 201, or 301.

The determining may include, in the first mode change phase, determining the operation mode to be the one of the singing mode and the dialogue mode based on whether the analysis result satisfies activation conditions of the singing mode.

The one of more activation conditions of the singing mode may be classified according to a sensitivity level of the electronic device 101, 201, or 301 among a first sensitivity level, a second sensitivity level, and a third sensitivity level.

The controlling may include, in the dialogue mode, changing a volume of the one or more ambient sounds to a first gain and outputting the changed volume of the first gain and, in the singing mode, changing a volume of the one or more ambient sounds to a second gain and outputting the changed volume of the second gain.

The plurality of operations may further include tracking the singing voice included in the ambient sounds in the singing mode to provide information about the singing voice.

The electronic device according to the embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “A, B, or C,” each of which may include one of the items listed together in the corresponding one of the phrases, or all possible combinations thereof. Terms such as “first”, “second”, or “first” or “second” may simply be used to distinguish the component from other components in question, and do not limit the components in other aspects (e.g., importance or order). It is to be understood that if an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., by wire), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-predetermined integrated circuit (ASIC).

Embodiments of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer’s server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. In one or more examples or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless audio device comprising:

memory storing instructions; and a processor including processing circuitry, wherein the instructions, when executed by the processor, cause the wireless audio device to:

detect an audio signal, determine, based on an analysis result of the audio signal, an operation mode of the wireless audio device to be one of a singing mode and a dialogue mode, wherein the dialogue mode is configured to output one or more ambient sounds comprised in the audio signal and the singing mode is configured to output one or more media sounds and the one or more ambient sounds comprised in the audio signal, and control an output signal of the wireless audio device according to the determined operation mode, wherein the instructions, when executed by the processor, cause the wireless audio device to determine the operation mode of the wireless audio device by:

while a current sensitivity level associated with activation of the singing mode is a first sensitivity level, activating the singing mode based on the analysis result of the audio signal satisfying an activation condition according to the first sensitivity level, wherein the activation condition according to the first sensitivity level includes continuously detecting a singing voice from the one or more ambient sounds for a duration of frames longer than a threshold number of frames adjusted based on a noise level, while the current sensitivity level associated with determining activation of the singing mode is a second sensitivity level, activating the singing mode based on the analysis result satisfying both the activation condition according to the first sensitivity level and an activation condition according to the second sensitivity level, while the current sensitivity level associated with determining activation of the singing mode is a third sensitivity level, activating the singing mode based on the analysis result satisfying all of the activation condition according to the first sensitivity level, the activation condition according to the second sensitivity level, and an activation condition according to the third sensitivity level, and wherein the current sensitivity level is set by a user.

2. The wireless audio device of claim 1, wherein the instructions, when executed by the processor, further cause the wireless audio device to execute the instructions to determine the operation mode by entering, based on one or more of information related to an electronic device and whether media is played on the electronic device connecting to the wireless audio device, one of (i) a first mode change phase for determining to change to one of the singing mode and the dialogue mode, and (ii) a second mode change phase for determining to change to the dialogue mode.

3. The wireless audio device of claim 2, wherein the one or more of information related to the electronic device comprises one or more of environment information of the electronic device, location information of the electronic device, and information about a device around the electronic device.

4. The wireless audio device of claim 2, wherein the instructions, when executed by the processor, further cause the wireless audio device to execute the instructions to determine the operation mode by, in the first mode change phase, determining the operation mode to be the singing mode based on the analysis result satisfying one or more activation conditions of the singing mode.

5. The wireless audio device of claim 1, wherein one or more or more activation conditions according to the second sensitivity level comprise one or more conditions corresponding to an acoustic similarity between the singing voice comprised in the one or more ambient sounds and the media.

6. The wireless audio device of claim 1, wherein one or more activation conditions according to the third sensitivity level comprise one or more conditions corresponding to a similarity between lyrics comprised in the singing voice comprised in the one or more ambient sounds and lyrics comprised in the media.

7. The wireless audio device of claim 1, wherein the instructions, when executed by the processor, further cause the wireless audio device to control the output signal of the wireless audio device by, in the dialogue mode, changing a volume of the one or more ambient sounds to a first gain and outputting the changed volume of the first gain and, in the singing mode, changing the volume of the one or more ambient sounds to a second gain and outputting the changed volume of the second gain.

8. The wireless audio device of claim 1, wherein the processor is further configured to perform, in the singing mode, based on a determination one or more activation conditions of the singing mode are not satisfied, deactivating the singing mode.

9. The wireless audio device of claim 1, wherein the processor is further configured to execute the instructions to perform tracking the singing voice comprised in the one or more ambient sounds in the singing mode to provide information about the singing voice.

10. A wireless audio device comprising:

memory storing instructions; and a processor including processing circuitry, wherein the instructions, when executed by the processor, cause the wireless audio device to:

detect an audio signal, determine, based on an analysis result of the audio signal, an operation mode of the wireless audio device for the audio signal to be one of a singing mode and a dialogue mode, based on a determination that the operation mode is the dialogue mode, output one or more ambient sounds comprised in the audio signal, based on a determination that the operation mode is the singing mode, output one or more media sounds and the one or more ambient sounds comprised in the audio signal, and in the singing mode, based on a singing voice not being detected in the one or more ambient sounds for a period of time greater than or equal to a predetermined time period, deactivate the singing mode, wherein the instructions, when executed by the processor, cause the wireless audio device to determine the operation mode of the wireless audio device by:

while a current sensitivity level associated with activation of the singing mode is a first sensitivity level, activating the singing mode based on the analysis result of the audio signal satisfying an activation condition according to the first sensitivity level, wherein the activation condition according to the first sensitivity level includes continuously detecting the singing voice from the one or more ambient sounds for a duration of frames longer than a threshold number of frames adjusted based on a noise level, while the current sensitivity level associated with determining activation of the singing mode is a second sensitivity level, activating the singing mode based on the analysis result satisfying both the activation condition according to the first sensitivity level and an activation condition according to the second sensitivity level, while the current sensitivity level associated with determining activation of the singing mode is a third sensitivity level, activating the singing mode based on the analysis result satisfying all of the activation condition according to the first sensitivity level, the activation condition according to the second sensitivity level, and an activation condition according to the third sensitivity level, and wherein the current sensitivity level is set by a user.

11. The wireless audio device of claim 10, wherein the instructions, when executed by the processor, further cause the wireless audio device to determine the operation mode of the wireless audio device by entering, based on one or more of information related to an electronic device and whether media are played on the electronic device connecting to the wireless audio device, one of (i) a first mode change phase for determining to change to one of the singing mode and the dialogue mode, and (ii) a second mode change phase for determining to change to the dialogue mode.

12. The wireless audio device of claim 11, wherein the information related to the electronic device comprises one or more of environment information of the electronic device, location information of the electronic device, and information about a device around the electronic device.

13. The wireless audio device of claim 11, wherein the instructions, when executed by the processor, further cause the wireless audio device to determine the operation mode of the wireless audio device by, in the first mode change phase, determining the operation mode to be the one of the singing mode and the dialogue mode based on whether the analysis result satisfies one or more activation conditions of the singing mode.

14. The wireless audio device of claim 13, wherein the one or more activation conditions of the singing mode are classified according to the current sensitivity level of the electronic device among the first sensitivity level, the second sensitivity level, and the third sensitivity level.

15. The wireless audio device of claim 10, wherein the processor is further configured to execute the instructions to:

in the dialogue mode, change a volume of the one or more ambient sounds to a first gain and output the changed volume of the first gain, and in the singing mode, change the volume of the one or more ambient sounds to a second gain and output the changed volume of the second gain.

16. The wireless audio device of claim 10, wherein the processor is further configured to execute the instructions to perform tracking the singing voice comprised in the one or more ambient sounds in the singing mode to provide information about the singing voice.

17. A method performed by a wireless audio device, the method comprising:

detecting an audio signal, determining, based on an analysis result of the audio signal, an operation mode of the wireless audio device to be one of a singing mode and a dialogue mode, wherein the dialogue mode is configured to output one or more ambient sounds comprised in the audio signal and the singing mode is configured to output one or more media sounds and the one or more ambient sounds comprised in the audio signal, wherein the singing mode is activated based on the analysis result satisfying one or more activation conditions of the singing mode corresponding to a current sensitivity level of an electronic device among a plurality of sensitivity levels, and controlling an output signal of the wireless audio device according to the determined operation mode, wherein the determining the operation mode of the wireless audio device comprises:

while the current sensitivity level associated with activation of the singing mode is a first sensitivity level, activating the singing mode based on the analysis result of the audio signal satisfying an activation condition according to the first sensitivity level, wherein the activation condition according to the first sensitivity level includes continuously detecting a singing voice from the one or more ambient sounds for a duration of frames longer than a threshold number of frames adjusted based on a noise level, while the current sensitivity level associated with determining activation of the singing mode is a second sensitivity level, activating the singing mode based on the analysis result satisfying both the activation condition according to the first sensitivity level and an activation condition according to the second sensitivity level, while the current sensitivity level associated with determining activation of the singing mode is a third sensitivity level, activating the singing mode based on the analysis result satisfying all of the activation condition according to the first sensitivity level, the activation condition according to the second sensitivity level, and an activation condition according to the third sensitivity level, and wherein the current sensitivity level is set by a user.

* * * * *